(12) United States Patent
Meyer et al.

(10) Patent No.: US 12,309,143 B1
(45) Date of Patent: May 20, 2025

(54) METHODS AND SYSTEMS FOR CREATING, VERIFYING, AND ENTERING SECURITY INFORMATION

(71) Applicant: INTEGRITY Security Services LLC, Santa Barbara, CA (US)

(72) Inventors: Alan T. Meyer, Anaheim Hills, CA (US); Cameron Durham, Santa Barbara, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

(21) Appl. No.: 18/675,443

(22) Filed: May 28, 2024

(51) Int. Cl.
*G06F 7/04* (2006.01)
*H04L 9/40* (2022.01)

(52) U.S. Cl.
CPC .................. *H04L 63/083* (2013.01)

(58) Field of Classification Search
CPC ....... H04L 63/083; H04L 9/08; H04L 9/0861; H04L 9/0863; G06F 21/31; G06F 21/335; G06F 21/45; G06F 21/46
See application file for complete search history.

(56) References Cited

U.S. PATENT DOCUMENTS

| | | | |
|---|---|---|---|
| 7,325,052 B1 | 1/2008 | Motoyama | |
| 11,580,237 B2 | 2/2023 | Meyer et al. | |
| 11,716,312 B1 * | 8/2023 | McNamara, Jr. | ....... G06F 21/46 726/6 |
| 2007/0050696 A1 | 3/2007 | Piersol et al. | |
| 2009/0009802 A1 | 1/2009 | Shaw | |
| 2012/0131354 A1 | 5/2012 | French | |
| 2013/0167228 A1 | 6/2013 | Wong | |
| 2013/0254856 A1 | 9/2013 | Krishan | |

(Continued)

OTHER PUBLICATIONS

Shirvanian et al, Sphinx: A Password Store that Perfectly Hides Passwords from Itself, Jun. 8, 2017, IEEE, pp. 1094-1104. (Year: 2017).*

(Continued)

*Primary Examiner* — Philip J Chea
*Assistant Examiner* — Jenise E Jackson
(74) *Attorney, Agent, or Firm* — MH2 Technology Law Group, LLP

(57) ABSTRACT

A system including a generator computer, a user computer, and a target computer. The generator computer generates high entropy security information. The user computer executes operations including receiving password manager access information and a retrieval key, accessing the password manager using the password manager access information, receiving the high entropy security information, storing the high entropy security information in the password manager, in association with the retrieval key, supplying the retrieval key to retrieve the high entropy security information that was stored in the password manager, and providing the high entropy security information on a user computer interface device. The target computer receives the high entropy security information provided by the user computer interface device, and provides access to the target computer when the high entropy security information is verified. The generator computer, the user computer, and the target computer are communicatively decoupled from each other.

30 Claims, 12 Drawing Sheets

(56) References Cited

U.S. PATENT DOCUMENTS

| | | | |
|---|---|---|---|
| 2014/0143554 A1* | 5/2014 | Torkkel | G06F 12/1408 |
| | | | 713/193 |
| 2014/0289870 A1 | 9/2014 | Selander | |
| 2015/0358163 A1 | 12/2015 | Carter | |
| 2017/0308695 A1* | 10/2017 | Adams | H04L 63/06 |
| 2018/0248859 A1* | 8/2018 | Zudic | H04L 63/06 |
| 2021/0124831 A1* | 4/2021 | Meyer | G06F 21/62 |
| 2022/0070000 A1* | 3/2022 | Gondza | H04L 63/123 |

OTHER PUBLICATIONS

Ziegler et al, Do You Think Your Passwords are Secure, May 14, 2014, IEEE, pp. 1-8. (Year: 2014).*

Lee W. Young, International Search Report and Written Opinion dated Jan. 25, 2021, PCT Application No. PCT/US2020/056793, 13 pages.

Marc Meis, Extended European Search Report dated Oct. 6, 2023, EP Application No. 20879104, 10 pages.

Hayashi et al., "WebTicket: account management using printable tokens", Proceedings of the 2012 ACM Annual Conference on Human Factors in Computing Systems, CHI '12, May 5, 2012, pp. 997-1006.

Office of Information Technology, "Guide to Protecting Your Computer & Your Identity @ CCNY for Students", Sep. 30, 2015, https://support.ccny.cuny.edu/pdf/Protect_Identity_Guide_Students.pdf, pp. 1-2.

Anonymous, "Specifications for micro dot printer Model-150III", Oct. 11, 1984, https://docs.rs-online.com/e7c1/0900766b80142cf6.pdf, pp. 1-19.

Henderson, "Smart Cards and PC Cards", Jan. 1, 1999, http://www.dtic.mil/dtic/tr/fulltext/u2/a363954.pdf, pp. 1-35.

FreeOTP, "FreeOPTP Two-factor authentication", Jul. 15, 2019, https://web.archive.org/web/20190715173628/https://freeotp.github.io/qrcode.html, 1 page.

FreeOTP, "qrcode.js", May 30, 2018, https://github.com/freeotp/freeotp.github.io/blob/53268a26348999d6804a76a9a42dfa41650de423/qrcode.js, 2 pages.

Focardi et al., "Usable cryptographic QR codes", 2018 IEEE International Conference on Industrial Technology (ICIT), IEEE, Feb. 20, 2018, pp. 1664-1669.

* cited by examiner

ISS Password Form

Key Check Value: 86a739

```
H  v  )  z  D  f  g  Q  T  %  )  R  1  F  3  [  T  <  z  D
00 01 02 03 04 05 06 07 08 09 10 11 12 13 14 15 16 17 18 19

00: H HOTEL      01: v victor      02: ) close paren   03: z zulu
04: D DELTA      05: f foxtrot     06: g golf          07: Q QUEBEC
08: T TANGO      09: % percentage  10: ) close brace   11: R ROMEO
12: 1 one        13: F FOXTROT     14: 3 three         15: [ open bracket
16: T TANGO      17: < less than   18: z zulu          19: D DELTA
```

Key Check Value: 86a739

ISS PIN Form

Key Check Value: cf40b6

```
 d   z   0   b   4   r   ~   g
---  --  --  --  --  --  --  --
 00  01  02  03  04  05  06  07

00: d delta      01: z ZULU      02: 0 zero      03: b bravo
04: 4 four       05: r romeo     06: ~ tilde     07: g golf
```

Key Check Value: cf40b6

```
ISS Key Component Form

Key Check Value: 58c3a6

0   0   1   2   1   b   5   7   6   c   d   2   1   5   5   c
 00  01  02  03  04  05  06  07  08  09  10  11  12  13  14  15
 1   e   e   3   e   8   8   1   9   2   5   4   9   6   0   7
 16  17  18  19  20  21  22  23  24  25  26  27  28  29  30  31    }—130
 4   d   b   0   b   b   b   1   7   4   c   a   d   5   d   e
 32  33  34  35  36  37  38  39  40  41  42  43  44  45  46  47
 7   3   a   a   3   5   e   e   1   3   c   a   4   9   5   3
 48  49  50  51  52  53  54  55  56  57  58  59  60  61  62  63

00: 6  six         01: 0  zero        02: 1  one         03: 2  two
04: 1  one         05: b  bravo       06: 5  five        07: 7  seven
08: 6  six         09: c  charlie     10: d  delta       11: 2  two
12: 1  one         13: 5  five        14: 5  five        15: c  charlie
16: 1  one         17: e  echo        18: e  echo        19: 3  three
20: e  echo        21: 8  eight       22: 8  eight       23: 1  one
24: g  nine        25: 2  two         26: 5  five        27: 4  four
28: g  nine        29: 6  six         30: 0  zero        31: 7  seven   }—220
32: 4  four        33: d  delta       34: b  bravo       35: 0  zero
36: b  bravo       37: b  bravo       38: b  bravo       39: 1  one
40: 7  seven       41: 4  four        42: c  charlie     43: a  alpha
44: d  delta       45: 5  five        46: d  delta       47: e  echo
48: 7  seven       49: 3  three       50: z  alpha       51: a  alpha
52: 3  three       53: 5  five        54: e  echo        55: e  echo
56: 1  one         57: 3  three       58: c  charlie     59: a  alpha
60: 4  four        61: 9  nine        62: 5  five        63: 3  three
```

Key Check Value: 58c3a6  —210

 135

METHODS AND SYSTEMS FOR CREATING, VERIFYING, AND ENTERING SECURITY INFORMATION

FIELD OF THE INVENTION

This invention relates to the systems, devices, manufactures, and methods for creating, verifying, retaining, and reliably entering security information, such as passwords, PINS, cryptographic keys, and the like. The security information may be created or generated by a dedicated computing system and may be automatically entered into another computing device, for example, to log into a highly secure server.

BACKGROUND

Security information, such as passwords, PINs, cryptographic keys, and the like, is best and most secure when it is in the form of a high-entropy string or set of characters. For example, the best passwords use both a large number of randomly chosen characters (e.g., 12 or more) and a large, varied character set (e.g., more than just the letters of the alphabet or just numbers) from which they are chosen.

A significant drawback, however, is that the higher the entropy of a set of security information characters, e.g., a password, the more difficult it is for a user to enter it correctly into a keyboard and to remember it. Typically, conventional systems and methods address this drawback by using physical paper forms on which a user manually writes down their high-entropy password. The forms are physically securely stored, e.g., locked in a safe, until needed, e.g., to log in to a highly secure computing system. To login, the user must retrieve the physical form, read the password, and then attempt to type the password from the form into a keyboard of the secure target computer system. This procedure is very time consuming and very difficult to perform without errors, especially for users with a reading, physical, or dexterity disability; in part because high-entropy passwords are by the nature of their characteristics difficult to type and remember.

Various embodiments described herein address these and other drawbacks associated with high-entropy security information.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for securely accessing a target computer using high entropy security information stored in a password manager. The system includes a generator computer configured to generate the high entropy security information, the generator computer including a generator computer interface device configured to provide the high entropy security information, and a user computer including a user computer interface device, a user computer reader, and a processor that is operably connected to the user computer interface device and the user computer reader. The processor is configured to execute operations including receiving, using the user computer interface device, password manager access information and a retrieval key, accessing the password manager using the password manager access information, receiving, using the user computer reader, the high entropy security information provided by the generator computer interface device, storing the high entropy security information in the password manager, in association with the retrieval key, supplying the retrieval key to retrieve the high entropy security information that was stored in the password manager, and providing the high entropy security information on the user computer interface device. The target computer includes a target computer reader configured to receive the high entropy security information provided by the user computer interface device, and a reader processor configured to provide access to the target computer when the high entropy security information is verified. The generator computer, the user computer, and the target computer are communicatively decoupled from each other. Other embodiments of this aspect include corresponding computer systems, apparatus, and computer programs recorded on one or more computer storage devices, each configured to perform the actions of the methods.

Implementations may include one or more of the following features. The user computer reader may include an image scanner or an optical character scanner. The user computer interface device may include a display and keyboard, a microphone, or a haptic device. The processor is included in any of a laptop, a handheld computer, a desktop computer, or a tablet. The operations may include detecting a security issue with the high entropy security information by validating the high entropy security information, and reporting the security issue. The high entropy security information may include characters, a machine-readable representation of the characters, and a key check value associated with the characters, where the key check value is configured to verify that the characters have not changed between accesses. The machine-readable representation may include a bar code. The operations may further include deleting the high entropy security information from the user computer after storing the high entropy security information in the password manager, and deleting the password manager access information from the user computer. Implementations of the described techniques may include hardware, a method or process, or computer software on a computer-accessible medium.

One general aspect includes a method for securely accessing a target computer using high entropy security information generated by a generator computer. The method includes generating, by the generator computer, the high entropy security information, the generator computer including a generator computer interface device configured to provide the high entropy security information. The method also includes receiving, by a user computer interface device associated with the user computer, password manager access information and a retrieval key. The method also includes accessing, by the user computer, the password manager using the password manager access information. The method also includes receiving, by the user computer interface device associated with the user computer, the high entropy security information provided by the generator computer interface device. The method also includes storing, by the user computer, the high entropy security information in the password manager, in association with the retrieval key. The method also includes supplying the retrieval key to retrieve the high entropy security information that was stored in the password manager. The method also includes providing, by the user computer, the high entropy security information on the user computer interface device. The method also includes receiving, by a target computer reader associated with the target computer, the high entropy security information provided by the user computer interface device. The method also includes providing, by the target computer, access to the target computer when the high entropy security information is verified. The method also includes where the generator computer, the user computer, and the target computer are communicatively decoupled from each other. Other embodiments of this aspect include corresponding computer systems, apparatus, and computer programs recorded on one or more computer storage devices, each configured to perform the actions of the methods.

Implementations may include one or more of the following features. The method may include validating the high entropy security information including detecting a security issue with the high entropy security information and reporting the security issue. The method may include deleting the high entropy security information from the user computer after storing the high entropy security information in the password manager. The method may include deleting the password manager access information from the user computer. The high entropy security information may include characters, a machine-readable representation of the characters, and a key check value associated with the characters, where the key check value is configured to verify that the characters have not changed between accesses. The machine-readable representation may include a bar code. The method may include receiving, by the user computer interface device, the high entropy security information by scanning the high entropy security information provided by the generator computer using at least one of an image scanner or an optical character scanner. The user computer interface device may include a display and keyboard, a microphone, or a haptic device. The user computer may include any of a laptop, a handheld computer, a desktop computer, or a tablet. The high entropy security information may include machine-readable information. Implementations of the described techniques may include hardware, a method or process, or computer software on a computer-accessible medium.

One general aspect includes a non-transitory computer-readable medium storing instructions including generating, by the generator computer, the high entropy security information. The generator computer includes a generator computer interface device configured to provide the high entropy security information. The instructions also include receiving, by a user computer interface device associated with the user computer, password manager access information and a retrieval key, accessing, by the user computer, the password manager using the password manager access information, receiving, by a user computer interface device associated with the user computer, the high entropy security information provided by the generator computer interface device, and storing, by the user computer, the high entropy security information in the password manager, in association with the retrieval key. The instructions also include supplying the retrieval key to retrieve the high entropy security information that was stored in the password manager, providing, by the user computer, the high entropy security information on the user computer interface device, and receiving, by a target computer reader associated with the target computer, the high entropy security information provided by the user computer interface device. The instructions also include providing, by the target computer, access to the target computer when the high entropy security information is verified. The generator computer, the user computer, and the target computer are communicatively decoupled from each other. Other embodiments of this aspect include corresponding computer systems, apparatus, and computer programs recorded on one or more computer storage devices, each configured to perform the actions of the methods.

It is intended that combinations of the above-described elements and those within the specification may be made, except where otherwise contradictory.

BRIEF DESCRIPTION OF THE DRAWINGS

The accompanying drawings, which are incorporated into and constitute a part of this specification, illustrate examples and embodiments of the invention and together with the description, serve to explain the principles of the invention.

FIG. 7 is an example of a printed form that includes a 64-character key represented in characters and in a QR code, which may be generated and used by systems consistent with embodiments of the invention;

DETAILED DESCRIPTION

Figure 1A:
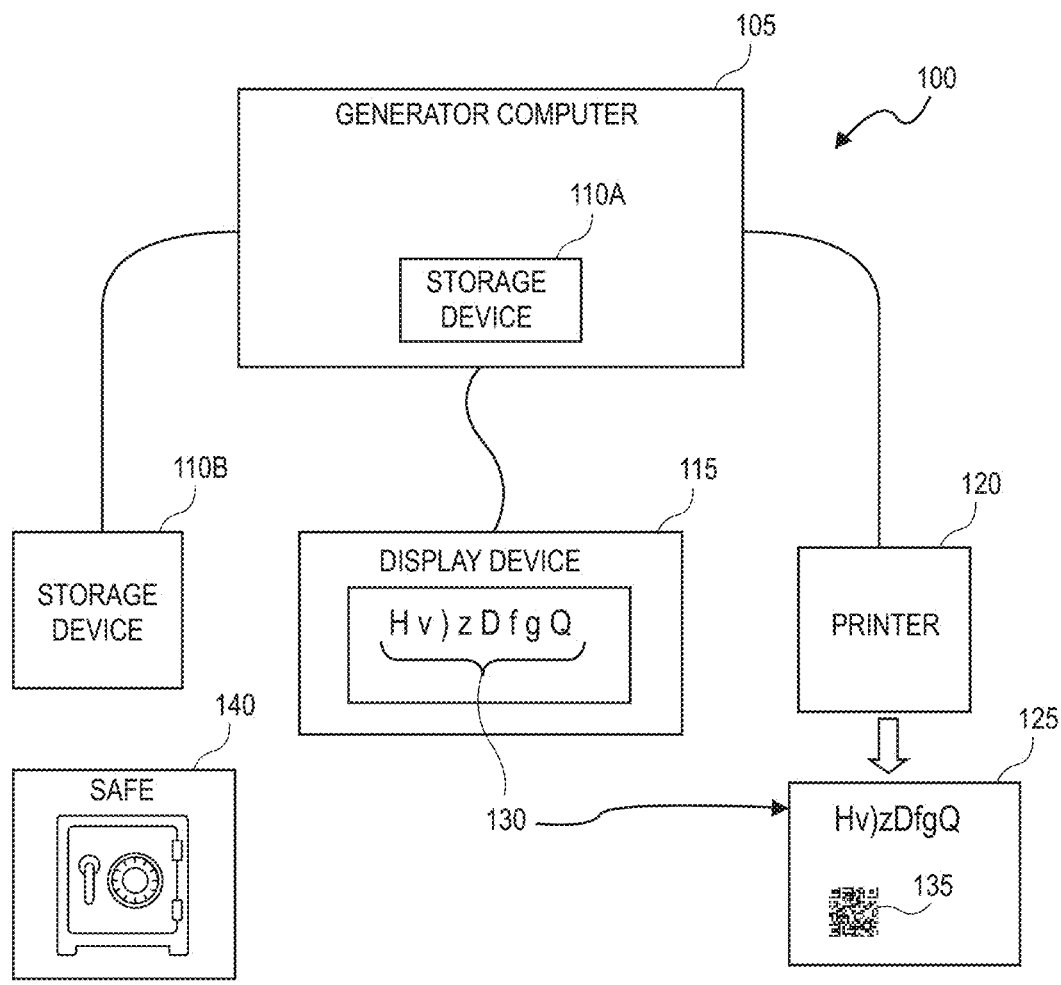
FIG. 1A is block diagram showing an example of a system for securely producing high-entropy security information, consistent with embodiments of the invention.

Reference will now be made in detail to embodiments of the invention, examples of which are illustrated in the accompanying figures.

Various embodiments and implementations consistent with the invention provide systems, components, methods, and computer products for generating and using high-entropy security information, (for example, a high-entropy password, PIN, key, or other high-entropy set of characters) that may be entered or employed, for example, to access a target secure computing system (e.g., a computing device containing sensitive data), and that may be represented and entered in a manner that essentially eliminates input errors by the user. This is a significant technical improvement to systems that use high-entropy security information, especially systems that allow very few input errors (e.g., five or less incorrect password entry attempts), before initiating a lock out.

As used herein, high-entropy information refers to information (e.g., a set of characters) that is difficult for someone to determine, guess or solve with a brute force attack or the like. In the case of a password and other types of security information, entropy is based on the size of the character set used (i.e., the number of possible characters that can be employed, which is expansible by using lowercase, uppercase, numbers, special characters, symbols, etc.), the randomness of the characters in the password (e.g., randomly chosen characters where each character is randomly selected independent of the previous characters, and that do not intentionally or unintentionally form or include words or names or dates), and the password length—i.e., the total number of characters in the password or other security-information string of characters. For example, the longer the password (or other security information) is, the bigger the possible character set is, and the more non-random subsets are avoided, the higher the entropy of the password.

One example of high-entropy information (i.e., a high-entropy set of characters) is a set of eight or more characters (e.g., for a PIN) that are randomly chosen from a group of keyboard characters (the keyboard character set) that includes: the 26 lower case letters of the alphabet, plus the 26 upper case letters of the alphabet, plus the numbers 0-9, plus the punctuation marks (period, question mark, exclamation point, comma, semicolon, colon, dash, hyphen, open parentheses, close parentheses, open bracket, close bracket, open brace, close brace, apostrophe, open single quotation mark, close single quotation mark, open double quotation mark, and close double quotation mark), plus the special characters on a keyboard: @, #, $, %, ^, &, *, +, =, |, \, <, >/, and '. Another example of high-entropy information (i.e., a high-entropy set of characters) is a set of 12 or more characters (e.g., for a password) that are randomly chosen from the keyboard character set described in the previous sentence. Another example of high-entropy information (i.e., a high-entropy set of characters) is a set of 20 or more characters that are randomly chosen from the keyboard character set described above, but minus one to three of the subgroups described, such as minus the special characters subgroup. Yet another example of high-entropy information (i.e., a high-entropy set of characters) is a set of 32 or more characters (e.g., a set of 64 characters for a crypto key) that are randomly chosen from the group of 16 hexadecimal characters or symbols (0, 1, 2, 3, 4, 5, 6, 7, 8, 9, a, b, c, d, e, f).

A significant drawback of using high-entropy security information, however, is that the higher the entropy of the set of characters that makes up the security information, (e.g., a password, a PIN, a key, etc.), the more difficult it is to enter or type correctly into a keyboard, (especially when the characters are not displayed during typing), and to remember. This can be particularly problematic for use in secure systems that lock out a user after a small number of unsuccessful attempts to enter a password, PIN, or the like (e.g., two or three failed attempts) and/or in secure systems that allow a short amount of time (e.g., 15 seconds or less) to enter a password, PIN, or the like and complete log in. These drawbacks, in turn, cause users to prefer, create, and commonly use passwords or PINs that are relatively short (e.g., less than 12 characters long), that contain non-random character strings (e.g., words, names, birthdates, etc.), that don't use capitals and lower case letters, and/or that contain no or a minimum amount of punctuation marks and special characters, (such as @, #, $, etc.).

The systems, methods, devices, and techniques described herein address these and other drawbacks and provide several technical advantages over existing systems and techniques, including encouraging or requiring the use of high-entropy security information, (e.g., long, random, broad-character-set-based sets of characters for passwords, PINs, and the like), increased security from using high-entropy security information, significantly increased speed to enter a high-entropy set of characters into a target computer, and elimination or a very significant reduction in entry (e.g., typing) errors, among others.

Various implementations of the systems, methods, devices, and techniques described augment the use of a password manager or the like, or to use an unsecure document or device to record and remember their high-entropy passwords. Various implementations of the systems, methods, devices, and techniques described herein may use a password manager or the like, and may eliminate the use of a printer. Various implementations described herein also allow a user to quickly and accurately enter their high-entropy passwords (or the like) into a secure target computer system with virtually no entry errors, despite the password being a lengthy, difficult-to-type, unmemorable, random set of characters that is prone to typing errors when entered via a keyboard.

Various implementation of the systems, methods, devices, and techniques described herein also reduce or eliminate the need or tendency for a user to create passwords that are not random and that are not long (i.e., that have low entropy), which users tend to do for ease of usability, remembering, and entering.

In many of the examples, embodiments, and implementations described herein, a password is used as an example of a high-entropy set of characters that is used as security information. As noted previously, it should be understood that a password is just one example of one type of security information that is described herein, and the principles of the invention apply to all types of security information in addition to passwords, such as PINs, cryptographic keys, other types of keys or character strings, etc.

FIG. 1A is block diagram showing an example of a system 100 for securely producing high-entropy security information 130, consistent with embodiments of the invention. In the example shown in FIG. 1A, the system 100 includes a generator computer or generator computing system 105 that may be dedicated to (e.g., used solely for) computing, calculating, generating, verifying, or otherwise producing high-entropy sets of characters 130 that are used as security information, such as a high-entropy password 130. In various embodiments, the generator computer 105 may be a computing device containing a processor, memory, and program instructions as are known in the art, such as a laptop computer, a desktop computer, a server, a tablet computer, or the like. In various embodiments, the generator computer 105 may be configured not to have (or to have disabled) any inter-computer communication components and capabilities, such as no wireless transceiver or wireless networking capabilities (e.g., no RF/Bluetooth components) and no wired network components or capabilities (e.g., no ethernet components). In general, the system 100 may be an isolated, off-line, stand-alone system that does not communicate with other computers, devices, or systems. Thus, the generator computer 105 and the system 100 desirably cannot electronically communicate any security information 130, such as a password, to another computer, device, or system. In some configurations, a trusted platform module (TPM), hardware security module (HSM), or other federal information processing standard (FIPS) compliant hardware device is used to further ensure high entropy. The TPM is a secure crypto-processor that is designed to carry out cryptographic operations including creating and managing cryptographic keys. The TPM can be used to ensure that an encryption key is only disclosed to authorized software. The HSM provides centralized key generation, including creating, rotating, archiving, and destroying keys.

As shown, the generator computer 105 of the system 100 may also include one or more storage devices 110A, 110B, which may be or include an internal storage device 110A, (e.g., an internal disk drive, solid state drive, memory (e.g., RAM), or a like storage medium), and/or an external or removable storage device 110B, (e.g., an external or removable disk drive, solid state drive, thumb drive, removable hard drive, or a like storage medium). In embodiments that include the external/removable storage device 110B, it may be connected to the generator computer 105 via wired (e.g., non RF) means, such as a USB or HDMI cable, by directly plugging into a port (e.g., a USB port for a thumb drive), or the like. In various embodiments, the generator computer 105 may be configured or programmed to delete all generated security information 130 from the storage devices 110A, 110B, after printing, as described further below.

In various embodiments, the removable storage medium 110B (e.g., a removable storage medium, such as a removable solid state or hard drive) may be erasable using another computer (not shown), such that any security information (e.g., a password, the barcode representation of the password, a corresponding key check value, etc.) stored, either accidentally or intentionally, on the removable storage medium 110B is permanently and securely deletable in that manner. In some embodiments, the removable storage medium 110B may be configured to detect whether it is being tampered with, and to render any security information, (such as the high-entropy set of characters and its machine-readable representation), unrecoverable upon detecting tampering, (such as by permanently erasing the high-entropy set of characters and the machine-readable representation). In various embodiments where the application(s) or program(s) that generates the high-entropy set of characters and/or verifies the high-entropy set of characters is stored on the removable storage medium 110B, deleting or erasing the high-entropy set of characters, etc. may be performed without deleting or erasing the application(s) or program(s) itself.

In some embodiments, the storage device 110A may be a volatile storage device or medium, such as RAM, that does not retain any information when the generator computer 105 is powered down, and the storage device 110B may be a non-writable storage device or medium, such as a ROM device, that contains the application or program code that performs the operations, functions, methods, and processes described herein, such as the processes 300 and 400 described below with respect to FIGS. 3 and 4. In such embodiments, the security information and associated representations generated by the system 100 cannot be stored on the non-writable storage device 110B, and can be only temporarily stored in the volatile storage device 110A—in the worst case, stored there at longest until the generator computer 105 is turned off after use.

The system 100 may also include a display device 115, such as a touch-screen computer monitor or the like, that is connected to the generator computer 105 via wired (e.g., non RF) means, such as a USB or HDMI cable. The display device 115 may display a user interface, including prompts and questions posed by an application or program; characters and responses entered by a user; and controls for the user to enter information via the touchscreen, such as a virtual keyboard, radio buttons, and the like.

The system 100 also includes a printer 120, such as a laser printer, or an inkjet printer or the like, that is connected to the generator computer 105, for example, via wired (e.g., non RF) means, such as a USB or HDMI cable. The generator computer may interface with the printer 120, (e.g., send commands or instructions), to cause the printer 120 to print on a paper 125 various things, such as a set of characters 130, a machine-readable representation 135 of the set of characters, and the like, as shown, for example in FIGS. 1B, 6, and 7. In various embodiments, the printer 120 may be configured not to have (or to have disabled) any non-volatile memory or other internal storage device that could store information, such as password, after the printer 120 is powered down, which configuration increases secureness. In various embodiments, the printer 120 may be configured not to have (or to have disabled) any wireless communication components and capabilities, such as no wireless transceiver or wireless networking capabilities (e.g., no RF/Bluetooth components), which also increases secureness. Thus, in such embodiments, the printer 120 cannot wirelessly communicate any security information 130, such as a password, to another computer or device. In various embodiments, the generator computer 105 may be configured or programmed to delete or cause the deletion of all generated security information 130 from the printer 120, after printing.

In various embodiments the generator computer 105 may perform processes, operations, and calculations that generate or produce representations of a high-entropy set of characters 130 both in the form of a human-readable sequence or set of keyboard characters 130 and in a machine-readable representation 135, such as a barcode, (for example, a QR code or the like). As shown in the example of FIG. 1A, the generator computer 105 may use the display device 130 to display the high-entropy set of characters 130 to a user, and the generator computer 105 may use the printer 120 to print the human-readable high-entropy set of characters 130 on a sheet of paper 125, along with a machine-readable representation 135 of the high-entropy set of characters 130. In various embodiments, the generator computer 105 may also create and cause the printer 120 to print additional information on the sheet of paper 125, as will be described in detail with respect to FIG. 1B.

Because the printer 120 prints the generated security information 130 on paper in both forms—e.g., as a string, sequence, or set of characters 130 and as a machine-readable representation 135 or the like, the user does not need to remember or manually write down the high-entropy security information that the system 100 created. Both the printed sequence of characters and the printed barcode contain, represent, and convey the same security information 130— e.g., the same high-entropy set of characters that the system 100 generated.

Figure 2:
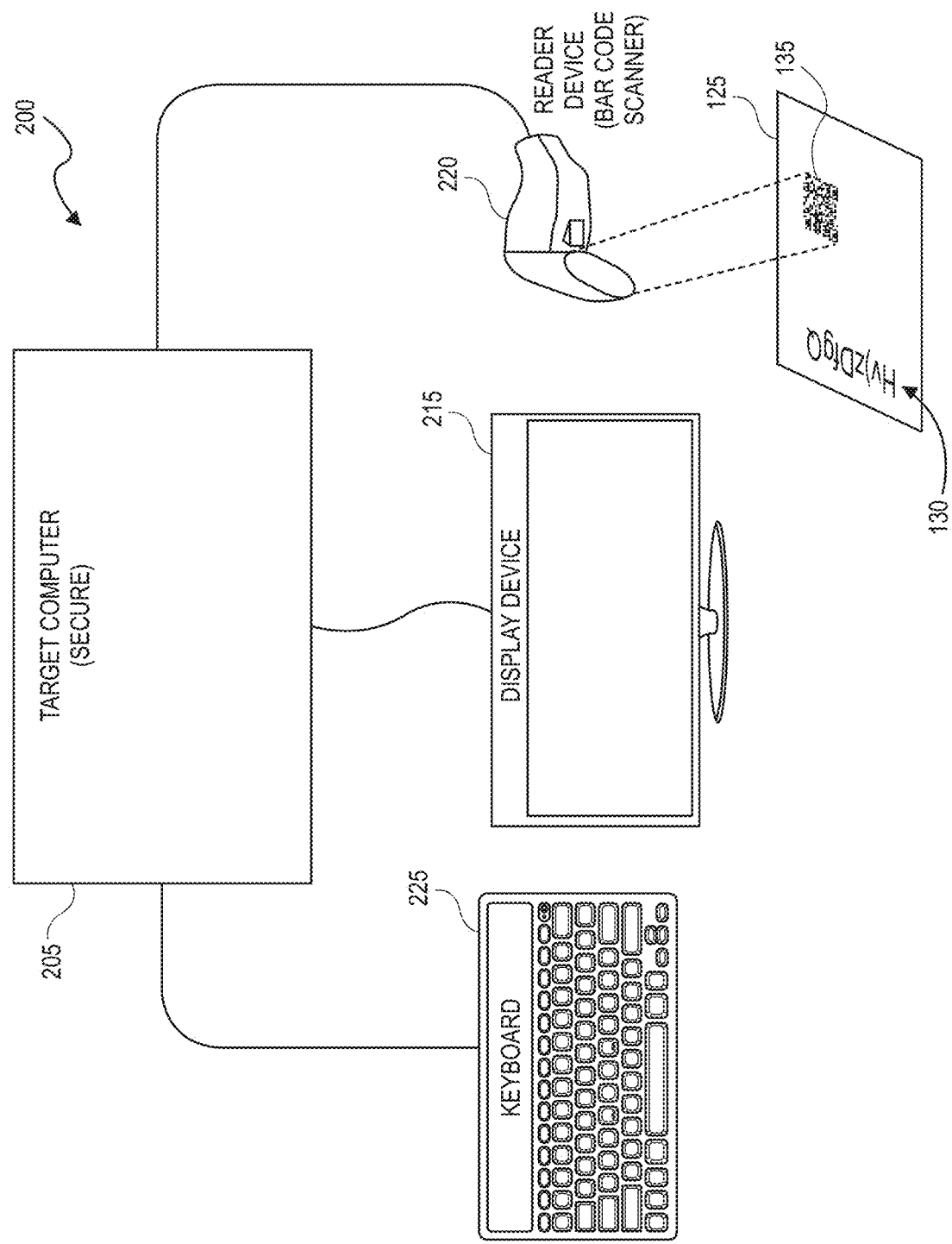
FIG. 2 is block diagram showing an example of a system for entering and using high-entropy security information, consistent with embodiments of the invention.

As described elsewhere herein in more detail, a user may read the paper form 125 while typing the human-readable high-entropy set of characters 130 into a target computer or device, and/or may enter the machine-readable representation 135 (e.g., barcode) into a target computer or device (e.g., a secure target computer 205 as shown in FIG. 2) by scanning it using an automatic reading device (e.g., a barcode scanner or reader) connected to the target computer or device.

In the example of FIG. 1A, a safe 140 or other locked enclosure may be available to hold and physically secure the printed paper 125 when the user is not using the paper 125 to enter the security information 130 into a target computer or device. In various embodiments, the only record of the generated security information 130 may be the printed paper 125. In some embodiments, the safe 140 may also be used to hold an removable storage device 110B when not in use, so that any program code, etc. stored on the removable storage device 110B is not accessible to persons who cannot open the safe 140.

As noted, in various embodiments, the generator computer 105 may be programmed or configured to securely and completely delete all generated security information 130 and the like from its storage devices 110A, 110B, from the printer 120, and/or from the display device 115. In various embodiments, the generator computer 105 may be programmed or configured not to store the security information 130 in any type of non-volatile or lasting-memory device, for example, by storing all security information 130 only in volatile memory (e.g., volatile RAM) that is automatically erased when the generator computer 105 is requested to do so during normal operation, or once powered down.

Figure 1B:
FIG. 1B is an example of a printed form that includes a high-entropy password represented in characters and in a QR code, which may be generated and used by systems consistent with embodiments of the invention.

FIG. 1B shows an example of a paper form 125 that may be printed by the printer 120 when the generator computer 105 creates or generates security-information 130, which in this example is a high-entropy password 130. As shown in FIG. 1B, the paper password form 125 shows or represents the high-entropy password as a set of 20 human-readable characters 130 "Hv)zDfgQT%}R1F3[T<zD", and also as a machine-readable representation 135, which contains or represents the characters "Hv)zDfgQT%}R1F3[T<zD" in a barcode format.

In some embodiments, as shown in the example of FIG. 1B, the system 100 may calculate a checksum value, such as a key check value 210 (also known as a key checksum value or KCV) or the like, from or based on, the high-entropy set of characters 130, and may print the calculated KCV 210 on the paper form 125.

In various embodiments, the generator computer 105 may calculate or produce the KCV 210, or the like, by applying a cryptographically secure hash algorithm, such as the Advanced Encryption Standard Cipher Block Chaining (AES CBC) algorithm, to 16 bytes of zeroes while using the security information, which is the password 130 in this example, as the key for the hash algorithm, and then truncating the result so that only the first three bytes remain as the output value 210, where the 3 bytes may be represented as a 6-character hexadecimal string. In the example of FIG. 1B, the output of the checksum algorithm is the 6-character hexadecimal string "86a739" which is the KCV 210. As noted, other checksum algorithms, or the like, may be used to create the KCV 210 based on the set of characters 130. In embodiments that include a KCV 130, the set of characters 130 (e.g., a password 130) on the form 125 may be verified using the KCV 130, as described with respect to FIG. 4.

In some embodiments, as shown in the example of FIG. 1B, the system 100 may also represent the set of characters 130 by using or listing a phonetic or descriptive name for each character 220. The set of phonetic/descriptive names 220 aids a human user who might otherwise be confused or mistaken about characters that have a similar look when printed, such as the number one "1" and the lower case letter el "l", for example, when the user is attempting to type a set of characters 130 into a keyboard.

One of ordinary skill will recognize that the components and functions of the system 100 described in the example of FIGS. 1A and 1B may be changed or varied without departing from the scope of the scope of the present invention. For example, the system 100 may not have a storage device 110B or may have an additional storage device like device 110B. For another example, the storage device 110A may be nonvolatile, non-writeable, storage device (e.g., ROM) that stores the application or program code for performing the functions, operations, methods and/or processes described herein, and the storage device 110B may be volatile, writeable, erasable storage device (e.g., RAM) that only temporarily stores (e.g., until deleted or until device power down) the data generated and used by the application code or program code. For another example, the system 100 may not have a safe 140. For yet another example, the systems 100 may include a keyboard with which a user can enter information into the generator computer 105, in addition or alternatively to the touch-screen display device 115. Other variations are possible.

FIG. 2 is block diagram showing an example of a target system 200 for entering and using high-entropy security information 130, consistent with embodiments of the invention. In the example shown in FIG. 2, the target system 200 includes a target computer or computing device 205 that is secure in that it needs a password, a PIN, a cryptographic key or some other type of security information 130 in order to operate (e.g., to login), or for one or more of its programs or applications. For example, the secure target computer 205 may need to have a password entered into it in order for a user to log onto the secure target computer 205, and/or may need to have its password periodically changed by the user, as are known in the art.

In various embodiments, the target computer 205 may be a device such as a laptop computer, a desktop computer, a server, a tablet computer, a smartphone, or the like, which may be password protected. For example, the target computer 205 may be a password-protected secure server that contains critical, confidential, proprietary, sensitive and/or classified information.

As shown, the target system 200 may include a keyboard 225 or the like, which may be connected to the secure target computer 205 via wired (e.g., non RF) means, such as a USB or HDMI cable, and which may be is employed by a user to enter information, such as security information in the form of a set of characters 130, into the target computer 205.

The target system 200 may also include a display device 215, such as a computer monitor, a touch-screen monitor, or the like, which may be connected to the target computer 205 via wired (e.g., non RF) means, such as a USB or HDMI cable.

The target system 200 may further include a reader device 220 that can scan, read, and/or interpret the printed, machine-readable representation 135 from the paper 125 that was printed by the generator computer 105.

In various embodiments, the machine-readable representation 135 may be a printed indicia such as a barcode (e.g., a QR code), or the like, and the reader device 220 may be a barcode scanner, a digital camera, or the like. In various embodiments, the reader device 220, using, for example, its own built in decoder firmware and/or decoder software installed in the target computer 205, may scan, image, or otherwise detect the black and white elements of a machine-readable representation 135, and then interpret or convert the elements into the corresponding characters that the black and white elements represent. In the example of a barcode reader 220, the decoder may validate the barcode 134 using a check digit found in the machine-readable representation 135, recognize or detect the black and white elements of the machine-readable representation 135, and convert the black and white elements into a set of characters 130. This converted set of characters 130 may be used by the secure target computer 205, for example, as a login password, or the like.

In some embodiments, the reader device 220 (e.g., a barcode scanner) may be connected to the target computer 205 via wired (e.g., non RF) means, such as a USB or HDMI cable, while in other embodiments, a reader device 220 may be built into the target computer 205, such as a digital camera 220 that is built into a laptop computer, a tablet computer 220, a smartphone, or the like. In various embodiments, the reader device 220 that automatically reads the machine-readable representation 135 may mimic the keyboard 225 with respect to its interface with the target computer 205. In such embodiments, from the target computer 205's point of view, the output of the reader device 220 is the same or similar to that of the keyboard 225 when a user is typing in the set of characters 130 using the keyboard 225, albeit much faster and more accurate. In various embodiments, the reader device 220 may also be configured to delete any machine-readable representation 135, converted set of characters 130, and the like from its memory, if it stores such data.

In various embodiments, the display device 215 may display prompts, instructions, or the like directing the user to scan in (using the reader device 220) or type in (using the keyboard 225) the security information 130, 135 from the paper 125. By using the reader device 220 to automatically read the machine-readable representation 135 in order to enter the security information 130 into the secure target computer 205, the user avoids the time consuming and very-difficult-to-perform task of correctly typing in the high-entropy set of characters 130 without exceeding any time or retry limits imposed by the system 200. This is a significant improvement over the conventional keyboard technology for entering high-entropy information because it is an order of magnitude faster (e.g., less than 1 second verses 10+ seconds) and practically error-free compared to manually typing in the password, especially for users that have a reading, physical, or dexterity disability, as high-entropy character sets are by the nature of their characters difficult to manually type.

One of ordinary skill will recognize that the components and functions of the system 200 described in the example of FIG. 2 may be changed or varied without departing from the scope of the scope of the present invention. For example, the target system 200 may not have a keyboard 225, or the keyboard 225 may be disabled for the entry of security information, such that the password 130, 135 must be entered using the reader device 220.

For another example, the reader 220 may be a digital camera, and the system 200 may employ optical character recognition to automatically read the set of characters 130, instead of or in addition to employing barcode reading. Other variations are possible.

Figure 3:
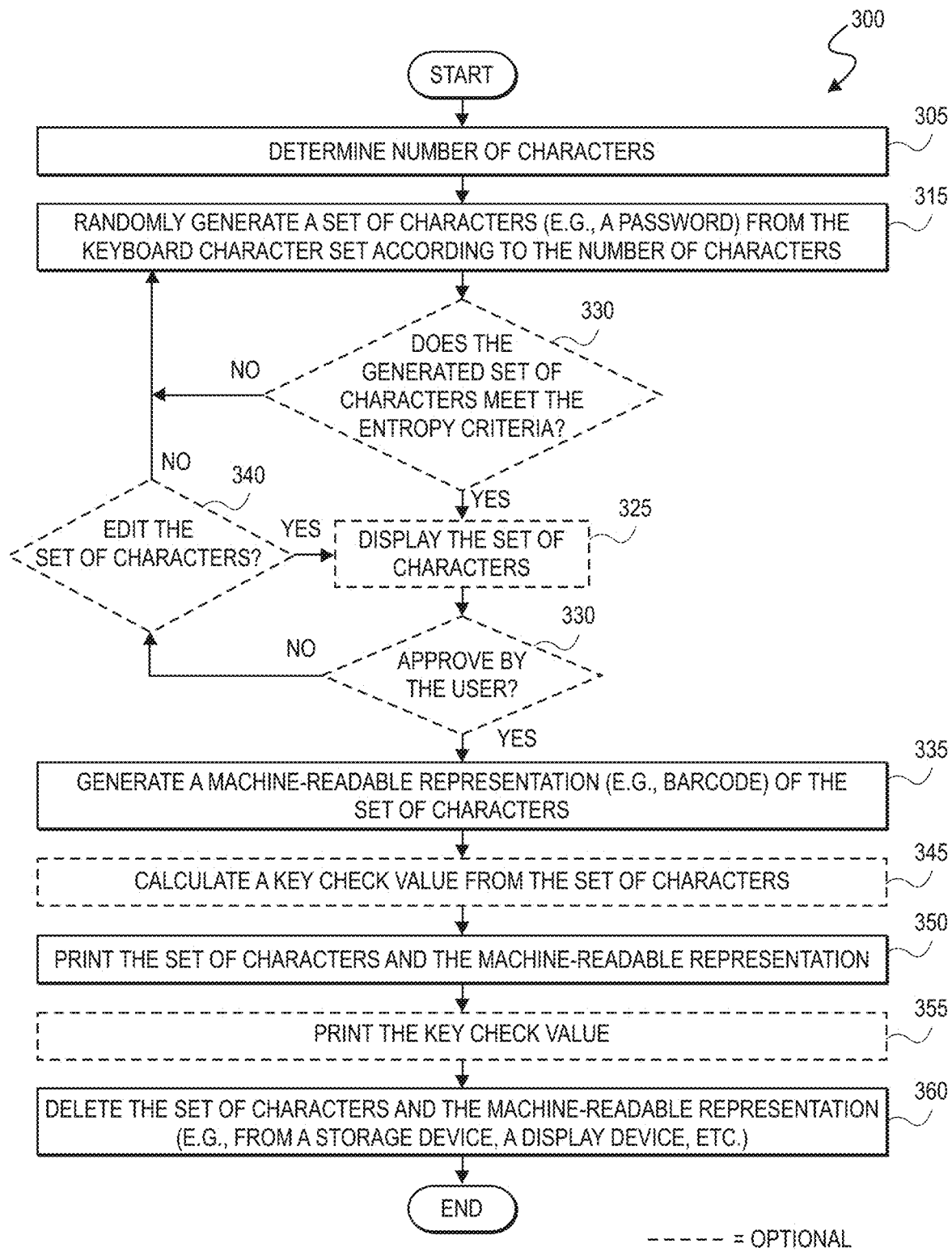
FIG. 3 is flow diagram showing an example of a process for securely producing high-entropy security information, consistent with embodiments of the invention.

FIG. 3 is flow diagram showing an example of a process 300 for securely producing or generating high-entropy security information, consistent with embodiments of the invention. In various implementations, some or all of the operations of the process 300 may be performed by the generator computer 105 or a similar computing system.

As shown in the example of FIG. 3, the process 300 begins at block 305 by determining the number of characters that will be in the set of characters 130. In some implementations the process 300 may obtain the number of characters from a user, for example by prompting the user to enter the number of characters that the user desires. In such implementations, the process may prompt and/or require the user to enter a minimum number, such as 12, or more so that the resulting set of characters will have high entropy. In other implementations, the process 300 may obtain an indication of the type of security information 130 desired, for example by prompting the user to enter or select a type, such as "password," "PIN," or "crypto key," and then determine the number of characters by setting the number to a predetermined value based on the selected type, or setting the number to a value randomly chosen from a predetermined range of values, where the range corresponds to the type selected. For example, the predetermined number of characters may be 20 for a "password" type, eight for a "PIN" type, and 64 for a "crypto key" type. Similarly, examples of the predetermined range of numbers may be 12-24 for a password and 6-9 for a PIN.

At block 315, the process 300 randomly generates a set of characters 130 from a keyboard character set (e.g., all the printable characters available on a keyboard, or a subset thereof), where the length of the set of characters is equal to the number of characters determined in block 305. In various implementations, the generator computer 105 may employ a randomization function or true random number generator (also known as a TRNG, which utilizes a high-entropy hardware-based seed value and a computer algorithm), as are known in the art, to choose a set of characters 130 from among all the possible printable characters available on a standard keyboard, such as lower case letters, uppercase letters, numbers, punctuation marks, and special characters (e.g., @, #, $, %, {, etc.).

For example, consider the use case where the process 300 determines that the number of characters is 20 based on information entered by the user indicating that the user wants to generate a password. In this use case, the generator computer 105 may generate a password by randomly select 20 characters, such as "Hv)zDfgQT%}R1F3[T<zD" (as shown in FIG. 1B), from all of the possible keyboard characters. Thus, the set of 20 characters "Hv)zDfgQT%}R1F3[T<zD" is the set of characters 130 output by block 315.

In the implementation shown in FIG. 3, at block 320, the process 300 determines whether or not the generated set of characters meets a set of criteria that characterizes a high-entropy character string. In an example where one of the criteria is not to contain a word or name, the process 300 may determine whether the generated set of characters contains any words or names by parsing the generated set of characters into subsets of characters, i.e., substrings, and comparing the substrings to a dictionary and/or to a list of names. In some such embodiments, criteria may be to not to contain a word or name that contains four or more characters, and in such embodiments the substrings may be a minimum length, such as four characters long or longer, so that the system 300 ignores three-letter words and names, two-letter words and names, and one-letter words and names.

For another example, the process 300 may determine whether the generated set of characters contains any substrings that are in the format of a date, such as "29Sep62" or "12-25-2020" or the like. For another example where one of the criteria is not to contain any common names, the process 300 may determine whether the generated set of characters contains any forwards-spelled or backwards-spelled words or names, such as "reyeM" or the like.

If the generated set of characters does not meet the set of criteria characterizing a high-entropy character string (block 320, No), for example because it contains a six-letter word, then the process 300 loops back up to block 315 to produce a new random set of characters.

In other embodiments (not shown), the process 300 may perform other actions instead of repeating block 315 in order to produce a set of characters that meets the entropy criteria. For example, the process 300 may scramble, reorder, remove, or otherwise modify only the substring(s) that do not meet the criteria (e.g., that form words or names or dates), while leaving the remaining portion(s) of the set of characters as is. Other variations are possible.

If, on the other hand, the process 300 determines that the generated set of characters meets the criteria characterizing a high-entropy character string (block 320, Yes), then the process 300 proceeds to display the set of characters (block 325). In an implementation using the system 100, the generated set of characters 130 may be displayed on the display device 115.

At block 330, the process 300 determines whether the generated set of characters is approved by the user. In some implementations, the process 300 may obtain approval from a user, for example by prompting the user to select either "approved" or "not approved" controls on a user interface shown on the display device 115.

If the generated set of characters is not approved (block 330, No), then the process 300 proceeds to block 340. At block 340, the user may either edit the displayed set of characters (block 340, Yes) (e.g., using a touch screen of the display device 115 or a keyboard (not shown in FIG. 1A)), or may direct the process 300 to proceed to block 315 (block 340, No) and generate a new random set of characters. If the user decides to edit the displayed set of characters in block 340, then the process 300 accepts input from the user, (e.g., the addition of a character(s), the deletion of a character(s), the changing of a character(s), etc.), that alters the set of characters 130. In such implementations, the generator computer 105 may provide an editor application that the user interacts with via the touch screen of the display device 115.

If, on the other hand, the generated set of characters is approved (block 330, Yes), then the process 300 proceeds to generate a machine-readable representation of the set of characters (block 325), such as a barcode, a magnetic ink pattern, or the like. For example, continuing our previous use case, the generator computer 105 may generate a machine-readable representation 135, such as a QR code, that encodes or contains information representing the set of characters 130 "Hv)zDfgQT%}R1F3[T<zD".

At block 345, the process 300 calculates a key check value (KCV) from the set of characters. In some embodiments, as described above with respect to FIG. 1B, the generator computer 105 may employ an AES CBC algorithm, or the like, to produce the KCV 210 consisting of the hexadecimal number "86a739" from the set of characters 130 "Hv)zDfgQT%}R1F3[T<zD".

At block 350, the process 300 prints the set of characters and the machine-readable representation of the set of characters, for example, on a piece of paper, thin cardboard, or the like. Continuing our previous use case, the generator computer 105 may cause the printer 120 to print the set of characters 130 "Hv)zDfgQT%}R1F3[T<zD" and the machine-readable representation 135 onto a piece of paper 125, as is shown in FIG. 1B.

At block 355 of the example of FIG. 3, the process 300 prints the KVC, typically on the same piece of paper as used in block 350, and as shown in the example of FIG. 1B. Although blocks 350 and 355 are described separately in the context of the implementation of FIG. 3 in order to make clear that the KCV-related operations are optional, in other implementations, the set of characters 130, the machine-readable representation 135, and the KCV 210 may all be printed together at approximately the same time. In other words, blocks 350 and 355 may be combined into a single block.

At block 360, the process 300 deletes the set of characters and the machine-readable representation, for example, from the memory and/or storage devices 110A, 110B, the display device 115, and/or any storage device (e.g., memory) of the printer 120. In various embodiments, this may include directing or instructing the printer 120 to delete the high-entropy set of characters 130 and the machine-readable representation 135 from its memory. In various embodiments, this may include stopping, erasing, or clearing the set of characters from being displayed on the display device 115 (see block 325). In various embodiments, where the storage device 110B is a removable storage device (e.g., a removable drive), this may include erasing or otherwise deleting the set of characters and the machine-readable representation from the removable storage device 110B.

In embodiments where the key check value was calculated according to block 345, block 360 may further include erasing or deleting the key check value, for example, from the memory and/or storage devices 110A, 110B, the display device 115, and/or any storage device (memory) of the printer 120. Thus, several embodiments have as an objective, among others, that the printed paper 125 is the only record of the set of characters 125, the machine-readable representation 135, etc. after the process 300 completes.

One of ordinary skill will recognize that the operations, functions, blocks, sequence, and order described in the example of FIG. 3 may be changed or varied without departing from the scope of the scope of the present invention. For example, all or some of the blocks that are outlined with dashed lines may be considered optional and may be omitted. For instance, the process 300 could be reduced to operations 305, 315, 335, 350, and 360 in some implementations.

For another example, blocks 325, 330, and 340 could be omitted in some implementations. For yet another example, block 330 could be omitted, such that the user may be the sole judge of the entropy of the generated set of characters. For yet another example, blocks 350 and 355 could be combined into a single block in some implementations.

For yet another example, a new block may be added to encrypt the set of characters, the machine-readable representation, and/or the KCV, (or in other words, securely store the generated security information representations) instead of deleting them in block 360, or block 360 may be omitted without being replaced. Other variations are possible.

Figure 4:
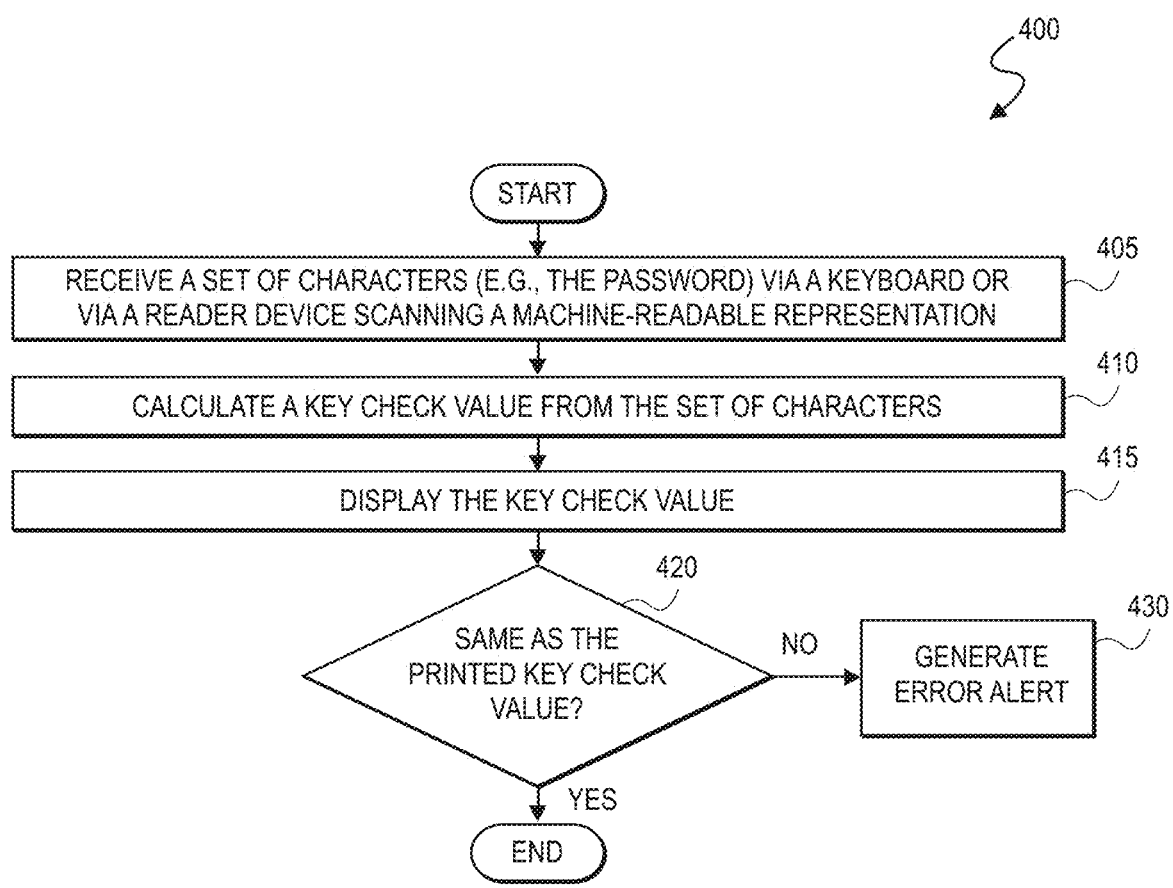
FIG. 4 is flow diagram showing an example of a process for verifying high-entropy security information, consistent with embodiments of the invention.

FIG. 4 is flow diagram showing an example of a process 400 for verifying high-entropy security information, consistent with embodiments of the invention. In various implementations, some or all of the operations and functions of the process 400 may be performed by the generator computer 105 or a similar computing system. In some such implementations, the system 100 may further include a reader device 220 and/or a keyboard 225. A user may employ the process 400 to validate or verify that the security information 130 and/or the machine-readable representation 135 on a paper form 125 have not been incorrectly calculated, forged, changed, altered, or the like. The user may desire to verify the information and representations on the paper form 125 before using them, for example, to set or change the password of a target computer 205, to set or change the PIN of a target smartphone or tablet computer, etc.

As shown in the example of FIG. 4, the process 400 begins at block 405 by receiving a set of characters, for example, the password set of characters 130 "Hv)zDfgQT%}R1F3[T<zD" as shown in the example of FIG. 1B. In some embodiments, the generator computer 105 that is implementing the process 400 may receive or obtain the set of characters 130 via the touch-screen display device 115 or a keyboard (e.g., like the keyboard 225), for example by prompting a user via the display device 115 to enter the set of characters from a password form 125 that was previously printed by the printer 120. Additionally or alternatively, in some implementations, the generator computer may receive or obtain the set of characters 130 from or via a reader device (e.g., like the reader device 220), for example by prompting a user via the display device 115 to scan the machine-readable representation 135 from a password form 125 that was previously printed by the printer 120.

At block 410, the process 400 calculates a key check value (KCV) from the set of characters that was received in block 405. In various embodiments, the generator computer 105 uses the same checksum algorithm in block 410 as was used in block 345 of FIG. 3. For example, it may employ the AES CBC algorithm to produce a KCV 210 with the value "86a739" from the password set of characters "Hv)zDfgQT%}R1F3[T<zD".

At block 415, the process 400 displays the key check value that was calculated in block 410. For example, in the implementation of system 100, the key check value 210 "86a739" may be displayed on the display device 115.

At block 420, the process 400 determines whether the calculated and displayed KCV is the same as the printed KCV 210 on the printed paper, for example the password form 125 shown in FIG. 1B.

In some implementations, this determination may be made by a user who compares the KCV that is displayed in block 415 to the printed KVC 210 that is printed on the password form 125. In such implementations, the block 420 may include additional operations to prompt the user to select an "approved" button or control on a user interface shown on the display device 115 to indicate that the displayed KCV is the same as the printed KVC 210; or conversely, to select a "not approved" button or control to indicate that they are not the same.

In some other implementations, this determination may be made by the process 400, which automatically compares the KCV that is displayed in block 415 to the printed KVC 210 that is printed on the password form 125. In some such implementations, the printed KVC 210 that is on the password form 125 may have been read and its characters subjected to optical character recognition using the reader device in block 405, and then compared to the calculated KCV from block 410. In some other such implementations, the block 420 may include operations to obtain the printed KVC 210 that is on the printed on the password form 125 from a user by prompting the user to type the printed KVC 210 into the system 100, and then comparing it to the calculated KCV from block 410.

If the calculated KCV is not the same as the printed KCV 210, (block 420, No), then the process 400 proceeds to block 430. At block 430, the process generates an error alert. Upon receiving an error alert, for example, via the display device 115, the user may discard or destroy the password form 125 before the password is put into use, (e.g., before it is used as the password on a secure target computer 205), and then use the generator computer 105 to produce a new password and corresponding password form 125, for example, as described with respect to process 300 of FIG. 3.

If, on the other hand, the calculated and displayed KCV is the same as the printed KCV 210, (block 420, Yes), then the process 400 ends without an error indication. When there is no error, the user may use the password form 125 to set or change the password, or the like, on the target computer 205 to be the high-entropy characters 130.

One of ordinary skill will recognize that the operations, functions, blocks, sequence, and order described in the example of FIG. 4 may be changed or varied without departing from the scope of the scope of the present invention. For example, block 405 may be changed to require that the set of characters be received only from a reader device 220, which interprets the machine-readable representation 135 on the paper form 125 in order to eliminate the possibility of typographical errors by a user. Other variations are possible.

Figure 5:
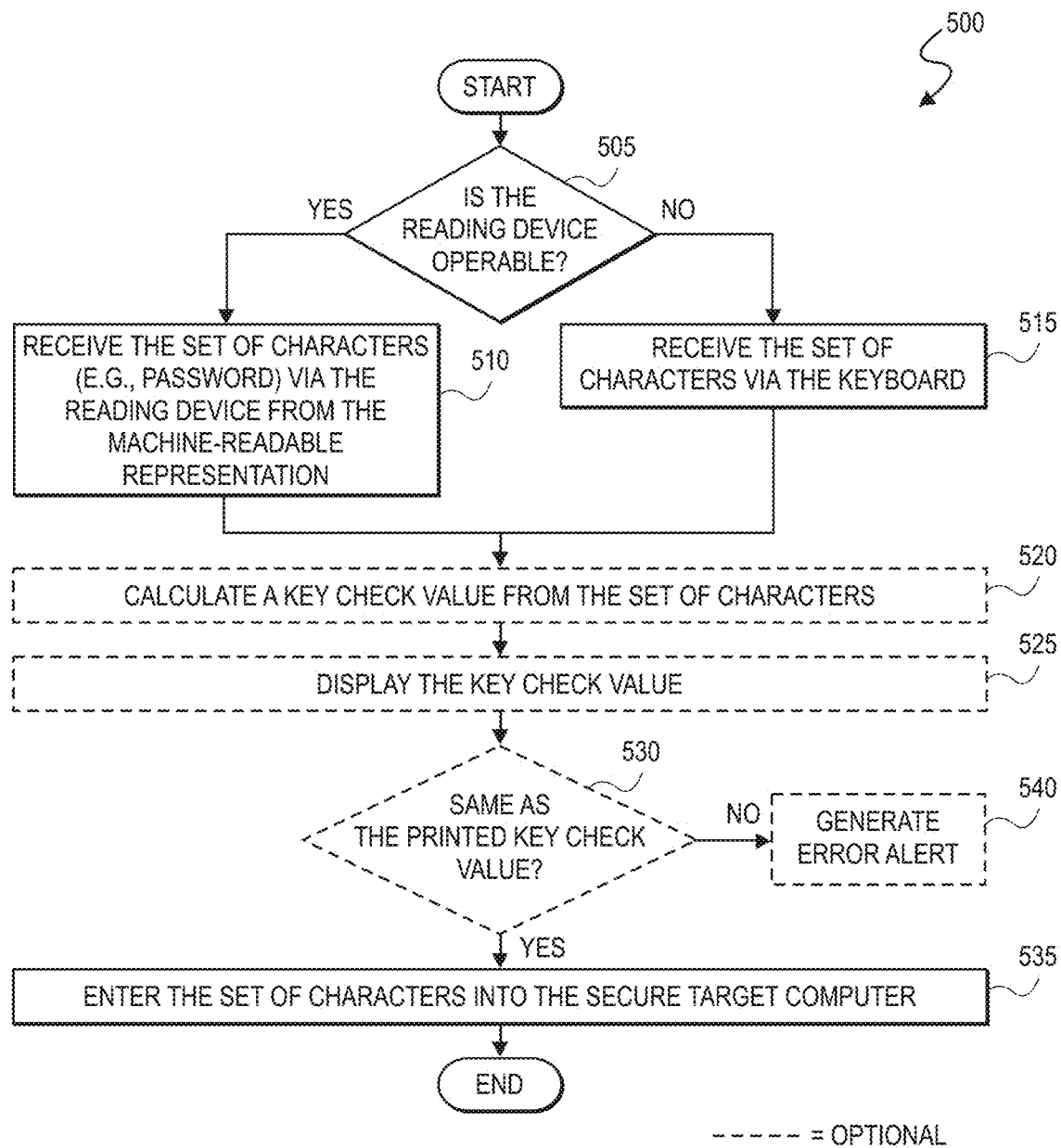
FIG. 5 is flow diagram showing an example of a process for entering and using high-entropy security information, consistent with embodiments of the invention.

FIG. 5 is flow diagram showing an example of a process 500 for entering and using high-entropy security information, consistent with embodiments of the invention. In various implementations, some or all of the operations and functions of the process 400 may be performed by the target computer 205 of the secure computing system 200 or a similar computing system or device, such as a smartphone. A user may employ the process 500 to enter the security information 130 and/or its machine-readable representation 135 from a paper form 125 into the target computer 205 in a fast and error-free manner. In some embodiments, the security information (i.e., the high-entropy set of characters 130) may be used by the operating system of the target computer 205 or by any application or program executing on the target computer 205 that requires or uses security information, such as a password, a PIN, a crypto key, or the like. For example, the user may employ the process 500 to first enter the current high-entropy password from a first password form 125 to log into the target computer 205, and then change the target computer 205's password by entering a new high-entropy password from a different password form 125 into a change-password application running on the target computer 205.

As shown in the example of FIG. 4, the process 500 begins at block 505 by determining whether the reading device 220 (e.g., a barcode reader) is operable. In the example of an implementation shown, the process 500 may require the user to employ the reading device 220 if it is operable, in order to enter the security information 130 in minimal time and to eliminate the possibility of human error when typing in the security information 130.

If the reading device 220 is operable (block 505, Yes), then the process 500 proceeds to block 510, and receives the set of characters 130, (e.g., a password 130 from the paper password form 125 shown in FIG. 1B), via the reading device 220, which interprets, reads, or converts the set of characters 130 from or based on the machine-readable representation 135 on the paper password form 125, as is known in the art.

If, on the other hand, the reading device 220 is not operable (block 505, No), then the process 500 proceeds to block 515, and receives the set of characters 130, (e.g., a password 130 as shown in FIG. 1B), via the keyboard 225.

In this case, the user may read the set of characters 130 from the paper password form 125 and type the characters into the keyboard 225.

At block 520, the process 500 calculates a key check value from the set of characters 130 that was received, and at block 525 displays the key check value, for example on the display device 215. In various embodiments, the target computer 205 executes the same checksum algorithm in block 520 as was executed by the generator computer 105 to produce the KCV 210 that the generator computer 105 printed on the paper password form 125. One example is the AES CBC algorithm used to produce a KCV 210 with the value "86a739" from the password set of characters "Hv)zDfgQT%}R1F3[T<zD", as described above with respect to block 345 of FIG. 3. As noted, other checksum algorithms known in the art may be used to generate and verify a key check value.

At block 530, the process 500 determines whether the calculated KCV of block 520 is the same as the printed KCV 210, for example, as shown on the password form 125 depicted in FIG. 1B.

In some implementations, this determination may be made by a user who compares the KCV that is displayed in block 525 to the printed KVC 210 that is on the printed password form 125, in the same manner as described above with respect to block 420 of FIG. 4.

In some other implementations, the determination of block 530 may be made by the process 500 (e.g., as performed by the target computer 205), which automatically compares the KCV that is displayed in block 525 to the printed KVC 210 that is printed on the password form 125, in the same manner as described above with respect to block 420 of FIG. 4.

If the calculated KCV from block 520 is not the same as the printed KCV 210, (block 530, No), then the process 500 proceeds to block 540. At block 540, the process 500 generates an error alert. Upon receiving an error alert, for example, via the display device 215, the user may cease or abort or retry (e.g., by redoing blocks 510 or 515) entering the security information (e.g., the password set of characters 130) into the target computer 205, as the KVC error alert may signify that the set of characters 130 and/or the machine-readable representation 135 on the paper form 125 have been altered, misread, entered incorrectly, or the like.

If, on the other hand, the calculated and displayed KCV is the same as the printed KCV 210, (block 5300, Yes), then the process 500 proceeds to block 535. At block 535, the high-entropy set of characters 130 (e.g., the password) received in block 510 or 515 is entered in the target computer 205 (e.g., into a program or application), and the process 500 ends. In some embodiments, the process 500 may prompt the user via the display device 215 for permission before entering the set of characters 130 into the target computer 205.

One of ordinary skill will recognize that the operations, functions, blocks, sequence, and order described in the example of FIG. 5 may be changed or varied without departing from the scope of the scope of the present invention. For example, all or some of the blocks that are outlined with dashed lines may be considered optional and may be omitted. For instance, the process 500 could be reduced to operations 505, 510, 515, and 535 in some implementations. For another example, block 505 may be changed to allow the user to employ the keyboard 225 to enter the security information 130, if the user so desires, even when the reading device 220 is operable. Other variations are possible.

Figure 6:
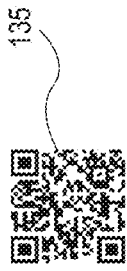
FIG. 6 is an example of a printed form that includes a high-entropy personal identification number (PIN) represented in characters and in a QR code, which may be generated and used by systems consistent with embodiments of the invention.

FIG. 6 is another example of a paper 125, here a Personal Identification Number (PIN) form, which may be printed by the printer 120 when the generator computer 105 creates or generates a high-entropy PIN 130 for a user. As shown in FIG. 6, the PIN form 125 in this example represents the PIN as a set of eight human-readable characters "dZ0b4fr~g" 130 and as a machine-readable representation 135. The PIN form 125 also includes a KCV 210 this is calculated based on the PIN set of characters 130.

FIG. 7 is yet another example of a paper form 125, here a key component form, which may be printed by the printer 120 when the system 100 creates or produces a high-entropy key 130 for a user. As shown in FIG. 7, the key component form 125 represents the key as a set of 64 human-readable characters 130 and as a machine-readable representation 135, and includes a corresponding KCV 210. In the example of FIG. 7, the high-entropy security information 130 is a cryptographic key. For the case of usage as a cryptographic key, the set of characters 130 may be restricted to being drawn only from the group of hexadecimal symbols (0, 1, 2, 3, 4, 5, 6, 7, 8, 9, a, b, c, d, e, f). Other use cases and implementation may similarly require that the set of characters 130 be drawn (e.g., randomly selected) from a specified group of characters. In such implementations, the process 300 of FIG. 3 may be modified such that block 315 randomly generates a set of characters 130 from the set of hexadecimal symbols (instead of from the keyboard character set).

In various embodiments described herein, because the security information, (e.g., PIN, password, key, etc.), is represented in a machine-readable representation 135 that is automatically entered into the target computer 205, the generator system 100 can be configured to produce long, random, and extremely secure sets of characters for passwords and the like that include 20 characters or more, such as 25 characters, 30 characters, or 64 characters without the drawbacks associated with conventional systems. The high entropy nature of these sets of characters will not hinder usage by a person because the person does not have to remember or manually type in the characters.

Figure 8:
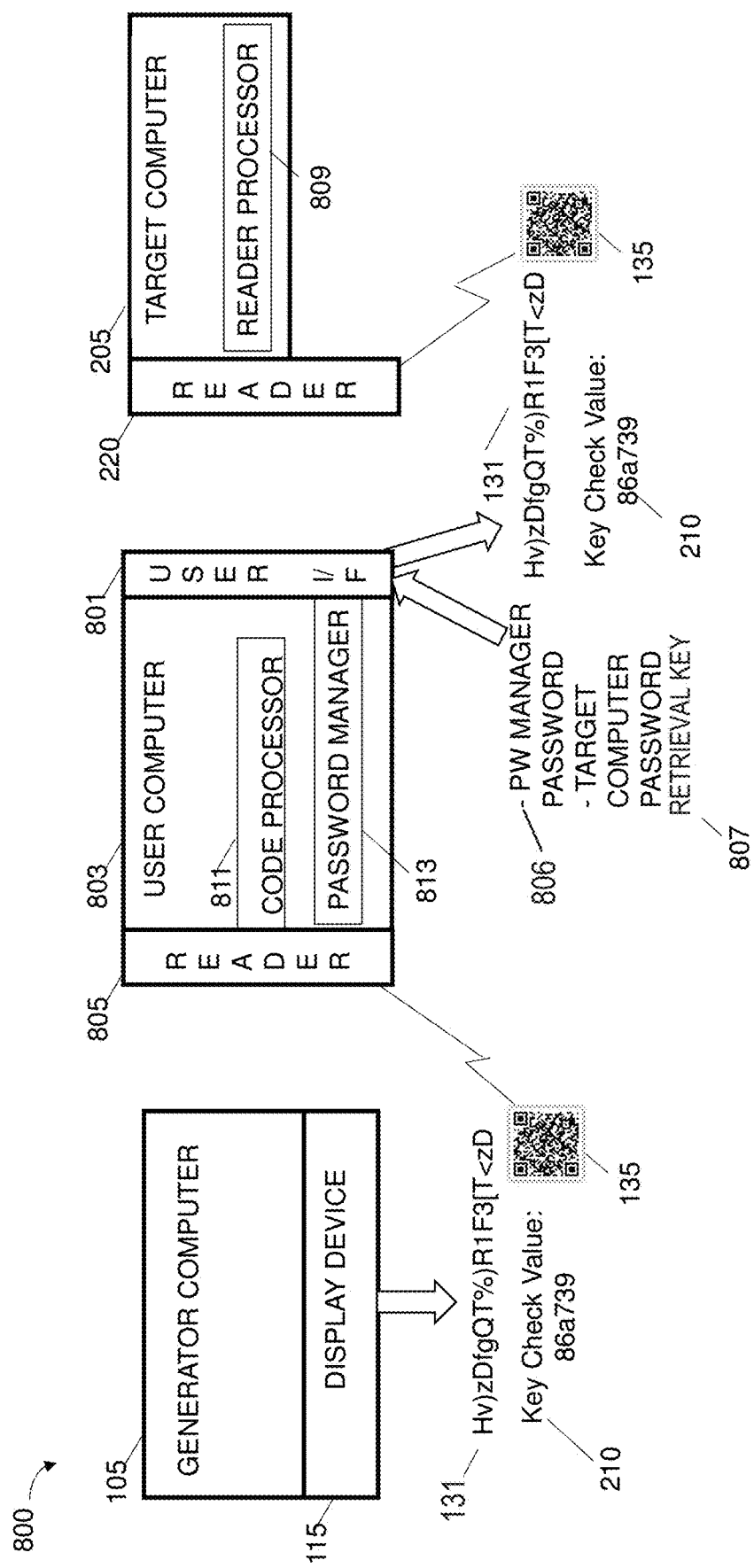
FIG. 8 is a schematic block diagram of a configuration of the system of the present disclosure that includes a user computer consistent with embodiments of the invention.

Referring now to FIG. 8, a configuration 800 is shown in which a conventional or custom password manager 813 is used to store the high entropy data 131, for example, a password, eliminating the need for the printer (e.g., printer 120 (FIG. 1A)). In some configurations, the password manager 813 is a commercially-available product that stores passwords and other sensitive information. In some configurations, the password manager 830 is a custom-created product that shares the characteristics of a commercially-available password manager, such as, but not limited to, storing passwords and other sensitive information, as well as performing other application-specific functions.

In some configurations, the generator computer 105 produces a high-entropy set of characters 131 (which may also be referred to as a password 131 herein), and displays the characters 131, and a key check value 210 and a machine-readable representation 135 (e.g., QR/Barcode) associated with the characters 131. Password generation, i.e. production of the characters 131, the key check value 210, and the machine-readable representation 135 (e.g. QR code) are discussed herein and are the same when the password manager 813 is used to store high entropy security information, such as password information, for the target computer 205 as when a printed sheet is used to store the same information. The computer product (either software, firmware, or hardware, or a combination) of the present disclosure, which executes on a user computer 803, enables scanning the generator computer's display device 115 (e.g., a reader 805 that scans a machine-readable representation 135 displayed on the display device 115), receiving user access information for the password manager 813, receiving a retrieval key 807 associated with the generated password from the user, opening the password manager 813 using the provided password manager password 806, and storing the generated characters 131 in association with the retrieval key 807 in the password manager 813.

To access the target computer 205, the user may enter into the user computer 803 a password 806 for the password manager 813 and the identification information (retrieval key) 807 that is associated with the target computer password 131. The password manager 813 is accessed using the user-provided password 806. The password manager 813 operates in a conventional manner, i.e. the characters 131 and key check value 210 stored in the password manager 813 associated with the retrieval key 807 are retrieved. In various embodiments, the user computer 803 converts the retrieved characters 131 into a machine-readable representation 135 (e.g., a barcode, such as a QR code), if necessary, checks the accuracy of the retrieved characters 131, and displays the QR display machine-readable representation 135 and other associated data if the retrieved characters 131 pass the accuracy test. The QR code reader 220 associated with the target computer scans the machine-readable representation 135 that is displayed on the user computer 803, as if the machine-readable representation 135 had been printed, and operations continue as described herein.

As shown in this example, the generator computer 105, the user computer 803, and the target computer 204 are electronically and/or communicatively decoupled or isolated from each other. For example, there are no conventional connections, either wired or wireless, among the generator computer 105, the user computer 803, and the target computer 204. As described herein, the computers 105, 803, 205 may instead be configured to employ for example, but not limited to, visual displays (e.g., 115, 801) and optical readers (e.g., 805, 220) to provide and obtain information to each other.

Continuing to refer to FIG. 8, in an aspect, the user computer 803 is a handheld device such as a cell phone or a tablet. In another aspect, the user computer 803 is a laptop or a desktop. Other types of computers or processors are contemplated by the present disclosure. Any CPU-based device that has the capacity to perform the operations and functions of the present disclosure, implement or otherwise operate with a reader, implement or otherwise operate with a graphical user interface (GUI) and implement or otherwise operate with a display device, and/or implement or otherwise operate with a conventional or custom password manager can be used. In an aspect, the reader 805 and user interface 801 are electronically integrated with the user computer 803. For example, a conventional cell phone acting as the user computer 803 can read QR/bar codes and has an integrated user interface with a display. In an aspect, the reader 805 and user interface 801 are not integrated with the user computer 803, but are provided as add-ons. For example, a conventional laptop is configured with a display, and a reader can be connected to operate through, for example, a USB connection. A desktop computer, on the other hand, can be configured with both a display and a reader through various forms of electronic connection, including, but not limited to, USB, HDMI, and serial connections.

Continuing to refer to FIG. 8, if the user computer 803 is a cell phone, tablet, or laptop, the device can be easily removed from the vicinity of the generator computer 105 and the target computer 205, presenting another barrier to unwanted access to the target computer 205. Similarly, a desktop/floor model processor could be moved from the vicinity of the generator and target computers to provide extra security. Any form of user computer 803 (e.g., a tablet, laptop, etc.) can be securely physically stored (e.g., a safe), and/or can be electronically secured using password login, multi-factor authentication login, and encryption of data, among other types of protection, which can further protect the target computer 205 from unwanted access. In any case, the generated high entropy information 131/210 may not normally be permanently stored on the user computer 803 or on any storage device associated with the user computer 803.

Continuing to still further refer to FIG. 8, in an aspect, the password manager 813 may be a commercially-available application such as, for example, but not limited to, DASHLANE™ from Dashlane Inc. of New York, NY NORDPASS® from Nord Security of Panama City, Panama, and KEEPER® from Keeper Security Inc. of Chicago, IL. In the context of this disclosure, the password manager 813 stores data, for example, passwords and other data, in a secure digital database, for example, an SSL-encrypted vault. In an aspect, the system (e.g., the user computer 803) of the present disclosure uses the password manager 813 to store characters 131, and/or a machine-readable representation 135 associated with the characters 131, and/or a key check value 210 used to validate that the retrieved password is the same as the generated characters 131. Users can access the stored data from the password manager 813 which is invoked by the user computer 803. Some conventional password managers are themselves only accessible through multi-factor authentication. Some conventional password managers provide assistance in generating the password 806 that is used to access the password manager 813. In some implementations, the data stored in the conventional password manager 813 can be located on or backed up in the cloud. Thus, when using some password managers 813, a user of the user computer 803 of the present disclosure can access the password manager 813 and retrieve the characters 131, as long as the password manager password 806 and the retrieval key 807 are known.

Continuing to refer to FIG. 8, in an aspect, a use case for the system 800 may begin with creating new high-entropy security information 131/210, including a characters 131, and transferring the characters 131 to the user computer 803. More particularly, the use case may start with the generator computer 105 displaying the newly generated characters 131, a key check value 210 that is associated with the characters 131, and a machine-readable representation 135 associated with the characters 131 on the display device 115, as has been described herein. In an aspect, the generator computer 105 displays only one of either the characters 131 or the machine-readable representation 135. In an aspect, a reader 805 that is operably coupled with the user computer 803 is used to scan at least the generator computer display device 115. In an aspect, the reader 805 is a camera conventionally provided with a smart phone or cell phone and the user computer 803 may be a smart phone. In an aspect, the reader 805 is invoked by an application executing on the user computer 803 that, for example, processes the read data in a similar way that a separate physical scanner device does, for example, the reader 805 may read the entire display on the display device 115 as if the display were a page fed to a hardcopy scanning device. In an aspect, the reader 805 is a QR code scanner associated with an application that automatically interprets the machine-readable representation 135 (e.g., barcode). A code processor 811 receives whatever is provided by the reader 805 (whatever is on the display device 115 or whatever has been selectively scanned/read/imaged) and automatically determines the next steps to prepare the target computer password information (e.g., the characters 131 and the key check value 210 for storage in the password manager 813). In various examples, the code processor 811 may be implemented as a set of computer instructions, such as component, module, application, program or the like, that is executed by the user computer 803 to perform the functions associated with the reader 805 and/or as described herein. Further processing steps for the read information are described with respect to FIG. 9, inter alia.

Continuing to refer to FIG. 8 and continuing the use case, after the user computer 803 has the newly generated characters 131, a user may log into the password manager 813 in order to have the password manager 813 securely store the newly generated characters 131. In an aspect, after all processing and checks (described herein) of the read/scanned characters/machine-readable code 131/135 are complete, the code processor 811 sends a user prompt to the user interface 801. In response, the user enters the password manager password 806 and a retrieval or search key 807, e.g., using a desired user interface option. The user interface 801 can provide, for example, but not limited to, visual, audible, or tactile interface options. After the user enters the password manager password and search/retrieval key 807, and after the password manager 813 is invoked, in an aspect, the code processor 811 accesses or finds the password manager password 806 and the retrieval key 807 from wherever they are stored on the user computer 803, and then deletes them so that they cannot be used again from storage on the user computer 803. In some implementations, a checksum or other check code (not shown in FIG. 8) can be associated with the password manager information 806/807, and the code processor 811 may validate the password manager information 806/807 using the check code (e.g., as described herein with respect to FIG. 4). In an aspect, multi-factor or another form of secure authentication is required to retrieve the password manager information 806/807 from wherever it might be stored on the user computer 803, if stored on the user computer 803.

Continuing to refer to FIG. 8, in an aspect, a user prompt requests the user to provide information 806/807 to enable the code processor 811 to open the password manager 813 and initiate a store of the read/scanned high entropy security information 131/210, or a retrieval of the high entropy security information 131/210. As described herein, other methods besides a displayed prompt can be used to acquire the password manager password 806 and retrieval key 807.

In an aspect, if the user does not already have an account with the password manager 813, the code processor 811 invokes the password manager 813 so that the user can set up an account with the password manager 813. When the user has set up an account with the password manager 813, or if the user already has an account with the password manager 813, the code processor 811 prompts the user for access information to the password manager 813 and uses that information to access the password manager 813 on behalf of the user, as just described. In an aspect, if the code processor 811 experiences difficulties in getting into the password manager 813 using the access information 807, the code processor 811 informs the user, logs the error, and optionally informs others of the failed access, possibly without storing or saving the characters used in the password attempt(s), e.g., the password manager password 806. In an aspect, the code processor 811 limits the number of access attempts and optionally locks the user out after a predetermined threshold number of attempts. In some aspects, multi-factor authentication can be used during the access attempt, and/or further extra security measures can be enabled by the code processor 811.

When new characters 131 for the target computer 205 are created, in some implementations, the code processor 811 may automatically create a retrieval key associated with the characters 131 for the target computer 205. In other implementations, the code processor 811 may prompt the user, e.g., through display 801, audibly, haptically, or otherwise, for a retrieval key 807, such as a string of characters entered by the user. The retrieval key 807 is used by the password manager 813 to provide a way to access the characters 131 for the target computer 205 so that a user can later retrieve the characters 131 from the password manager 813, for example, in order to gain access to (e.g., log in to) the target computer 205 or to change the characters 131 used to access of the target computer 205. In implementations where the code processor 811 creates the retrieval key 807, the code processor 811 displays or otherwise provides (as discussed herein) the retrieval key 807 to the user when a newly created characters 131 are saved for the first time in the password manager 813, because the user will need to provide both the retrieval key 807 and the password manager password 806 to later retrieve the high entropy security information 131/210 (i.e. the target computer access information) from the password manager 813.

Continuing the use case still further with reference to FIG. 8, when the user desires to access the target computer 205, the user may obtain the characters 131 from the password manager 813, and then use the characters 131 to log into the target computer 205. In some aspects, the user may invoke the code processor 811 on the user computer 803—for example, the user may run an application (e.g., 811) on their smart phone (e.g., 803). The code processor 811 can be selected by a user, (e.g., from a list of computer applications), or can be automatically invoked. In an aspect, automatic invocation is the result of periodic execution cycles, for example. Periodic execution can be implemented for password maintenance when a threshold amount of time (e.g., 15 days, 30 days, 45 days, 60 days, 90 days, or the like) has passed between invocations of the code processor 811. Such maintenance cycles can be used, for example, to prompt the user to change the password to the password manager 813, and/or change the high-entropy security information 131/210 for the target computer 205.

Because none of the generator computer 105, the target computer 205, nor the user computer 803 are electronically and/or communicatively coupled, prompts on the user computer 803 for automatic invocation of the code processor 811 will not be initiated directly by the generator computer 105 or the target computer 205. However, any of the generator computer 105 or the target computer 205 can indirectly inform the user when a maintenance cycle might be desired. For example, the generator computer 105 can encode alerts within, for example, the machine-readable representation 135, the characters 131, and/or the key check value 210, that can be interpreted by the code processor 811 when the reader 805 scans any or all of the characters 131, the key check value 210, and/or the machine-readable representation 135. The alerts might inform the user that, for example, the generator computer 105 is experiencing hardware or software issues that might compromise character generation. The generator computer 105 can directly inform the user of generator computer issues, or can encode the issues in the characters 131 or key check value 210 or both, such that downstream users (the user computer 803 and target computer 205) might be aware of possible issues with the generated password. In an aspect, the target computer 205 can provide visual, audible, and/or haptic feedback when it is unsuccessful in reading the generated/stored/retrieved password information provided by the user computer 803, or when the password information is not sufficient to provide access to the target computer 205, or when the target computer 205 is experiencing hardware or software issues.

Continuing to refer to FIG. 8, in an aspect, after the code processor 811 is invoked, the code processor 811 prompts the user for the password manager password 806 and retrieval key information 807, and uses that information to invoke the password manager 813 and obtain the stored characters 131. If the code processor 811 is unable to access the password manager 813 with the provided information, the code processor 811 can re-prompt the user. In an aspect, there is a limit on the number of re-prompts, and failures are logged and/or reported to authorities that manage the target computer 205.

Continuing to refer to FIG. 8, in an aspect, the code processor 811 prompts the user for the desired activity with respect to the target computer 205. Two possible such activities are to access the target computer 205 and to reset the characters 131 that are used to access the target computer 205. In either case, access to the target computer 205 using the high-entropy security information 131/210/135 from the password manager 813 is required. To access the target computer 205, the user retrieves, using the password manager password 806 and the password manager retrieval key 807, the target computer high-entropy security information 131/210/135. The code processor 811 displays or otherwise provides the high-entropy security information associated with the target computer 205—for example the user's smart phone (e.g., 803) may display a machine-readable representation 135 that represents the characters 131 on its screen. The reader 220 of the target computer 205 scans or otherwise reads the target computer high-entropy security information (e.g., machine-readable representation 135) and provides the characters 131 to the reader processor 809, which uses them to log the user onto the target computer 205. In some aspects, the reader processor 809 verifies that the target computer high-entropy security information 131 has not been tampered with, and provides access to the target computer 205 if no tampering is detected.

Continuing to refer to FIG. 8, if the user desires to change the high-entropy security information used to access the target computer 205, an additional step beyond accessing the target computer 205 using the retrieved high-entropy security information 131/210/135 is required. In an aspect, to change the password of the target computer 205, the generator computer 105 is employed, e.g., by the user, to generate new high-entropy security information 131/210/135, which is accessed by the user computer 803 as described herein. The new high-entropy security information is stored in the password manager 813 as described herein and is associated with a retrieval key 807 which is provided by or to the user.

Continuing to still further refer to FIG. 8, if the code processor 811 is unable to access the target computer high-entropy security information 131 from the password manager 813, the code processor 811 can re-prompt the user for the retrieval key 807. In an aspect, there is a limit on the number of re-prompts, and failures are logged and/or reported to authorities that manage the target computer 205.

Hints and password manager password/retrieval key resets are possible according to conventional means. For enhanced security, hints are not stored anywhere associated with the user computer 803. They could be provided when the password manager 813 is initially set up, along with the password manager password 806. Again, for enhanced security, the retrieval key reset functionality may not maintain a log of either the original retrieval key 807 or the reset value, and/or may encrypt the retrieval keys 807 and provide decryption instructions volatilely to the user.

Continuing to refer to FIG. 8, when the code processor 811 has accessed (or initially received) any of a machine-readable representation 135 or characters 131 or a combination, possibly including a key check value 210, the code processor 811 may verify that the password 131 has not undergone tampering. In an aspect, tamper detection is accomplished by, for example, computing a new password-character-based key check value according to the algorithm that was used to compute the key check value 210 and comparing the newly generated password-character-based key check value with the key check value 210. If the characters 131 have not been tampered with, the characters 131 and other data are stored in the password manager 813.

Figure 9:
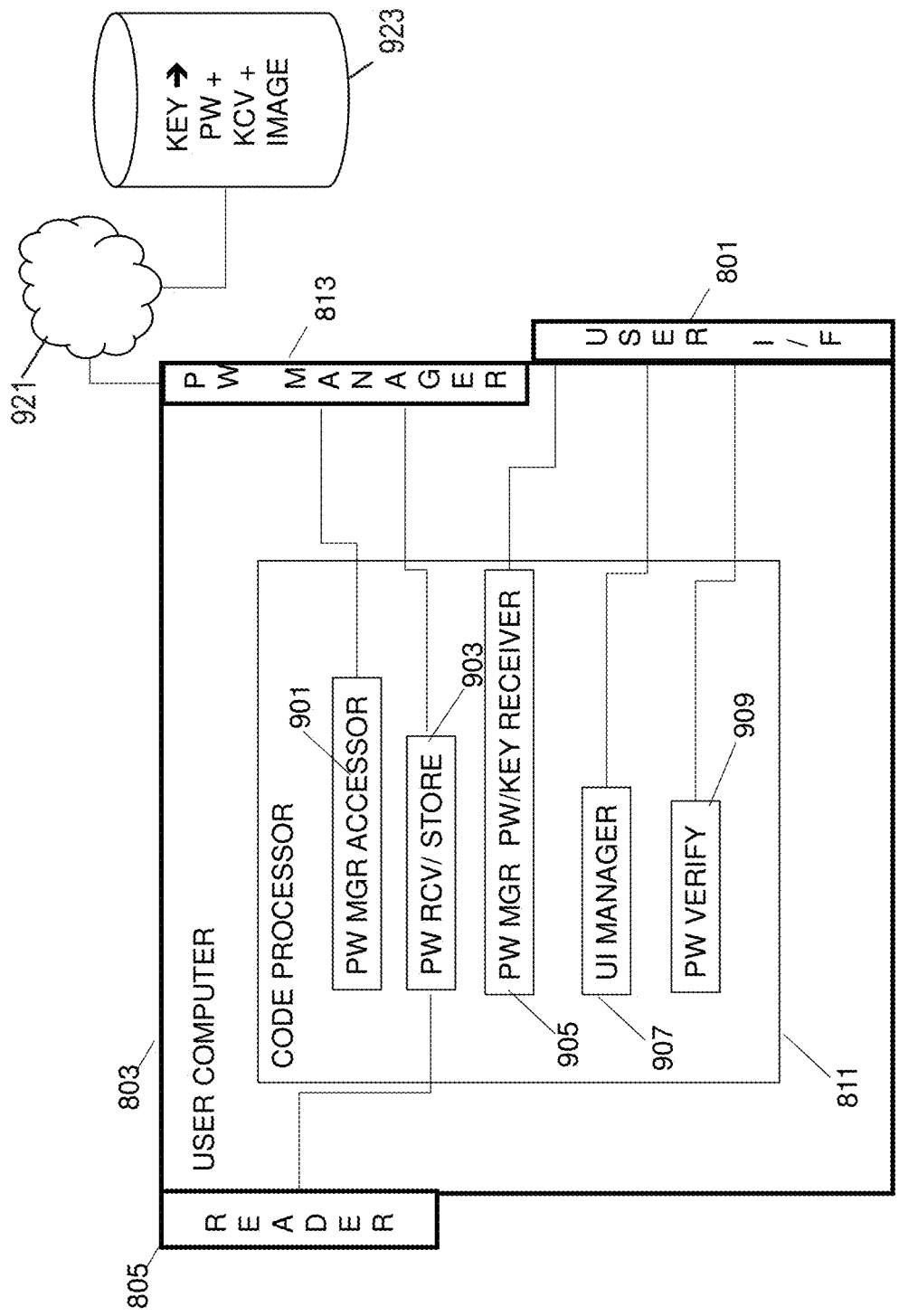
FIG. 9 is a schematic block diagram of an exemplary configuration consistent with embodiments of the invention of the user computer of FIG. 8.

Referring now to FIG. 9, in an exemplary configuration, the code processor 811 executes in the user computer 803. In some implementations, the user computer 803 may be or be included in a smart phone, and the code processor 811 may be a software application that runs on the smart phone. In an aspect, the user computer 803 is configured with components that accept input from a reading/scanning device 805, and provide/receive data to/from a user interface 801 and a password manager 813. The components are described further elsewhere herein. In some implementations, the reader 805 may be a camera or the like included in a smart phone (e.g., 803), the user interface 801 may be a touchscreen and/or microphone or the like included in the smart phone, and the password manager 813 may be another software application that runs on the smart phone.

The present disclosure contemplates further components and other configurations. For example, multiple password managers 813 could be used for redundancy. Multiple readers 805 and/or different types of readers and scanners can be used to enable accessibility to the system. The user interface 801 can include audio, visual, and haptic devices. In the exemplary configuration, the code processor 811 includes software components, and/or firmware components, and associated hardware, such as a password manager accessor 901 that accesses the password manager 813, a password receiver/store component 903 that receives and stores the target computer high-entropy security information (e.g., 131, 210, 135), a password manager password/retrieval key receiver component 905 that receives the password manager password 806 and retrieval key 807, a user interface manager 907 that manages the user interface 801, and/or a password manager password verify component 909 that is automatically invoked to verify the target computer password 131. The password manager password verify component 909 can inform the user through the user interface 801, for example, if the target computer characters 131 do not verify.

Continuing to refer to FIG. 9, in an aspect, the code processor 811 performs at least three functions: receiving and processing the generated high-entropy security information (e.g., 131, 135, 210 from the generator computer 105), storing the generated high-entropy security information in the password manager 813, and retrieving the high-entropy security information from the password manager

813. Alternatively, the user can manually store the target computer characters 131 and key check code 210 in the password manager 813 without the features of the code processor 811 being invoked. The code processor 811 can additionally manage reporting of possible security issues, for example, and error logging. Security issues include multiple unsuccessful attempts to log in to the password manager 813 or attempts to compromise the user computer 803.

Receiving and processing the generated high-entropy security information 131/210/135 requires managing the reading process, parsing what is received from the reader 805 to determine what actions to take, and optionally validating the generated high-entropy security information. In an exemplary configuration, these processes are performed by a password receive component 903. In an aspect, the generated high-entropy security information includes the characters 131, the machine-readable representation 135 representing the characters 131, and a key check value 210. The code processor 811 receives this information, stores it in the password manager 813, and retrieves it for a user to access the target computer 205. In some configurations, the password manager 813 stores the high-entropy security information 131/210/135 remotely from the user computer 803. For example, storage 923 through network 921 can be used for storage of the high-entropy security information 131/210/135. In an aspect, the characters 131 and/or the machine-readable representation 135, and/or the key check value 210 are stored/retrieved in use cases where the user will enter the target computer characters 131 manually, or use cases where a machine-readable representation reader 805 will be used to obtain the target computer characters 131, e.g., as encoded in a machine-readable representation 135. If the code processor 811 and/or the target computer 205 are configured to validate the characters 131, the key check value 210 is stored/retrieved. In an aspect, the key check value 210 is encoded with the characters 131 in the machine-readable representation 210.

Continuing to refer to FIG. 9, in an aspect, when the code processor 811 is activated, the code processor 811 determines which devices are configured in the user computer 803 upon which the code processor 811 is executing. In an aspect, a separate reader 805 (e.g., a bar code reader) is communicatively coupled with the user computer 803 wirelessly or wired (e.g., via a USB). The bar code reader 805 may be a conventional product, wherein the bar code image (e.g., machine-readable representation 135) is converted to characters by the reader 805 or by a reader application executing on the user computer 805, which typically causes a pre-programmed action to occur, such as accessing a URL represented by the characters in the bar code. In an aspect, the code processor 811 obtains the output from the conventional bar code reader 805 and interprets the characters as the target computer characters 131, instead of, for example, a URL.

In another example, the reader 805 may be a character scanner that is coupled with the user computer 803. In an aspect, the reader 805, for example, an optical character reader scanner, supplies the scanned characters digitally, not as an image. In an aspect, if the reader 805 is an optical character reader scanner, the password receive component 903 converts the received characters into a QR image.

In another example, the reader 805 may be a camera, such as an integrated camera on a cell phone, and its images are provided to the password receive/store component 903. In an aspect, the password receive/store component 903 converts the images to characters that are stored and used to access the target computer 205. No matter how or in what form the generated high-entropy security information (e.g., 131, 135, 210) arrives into the code processor 811, the code processor 811 parses or otherwise processes the information to identify the characters 131, the machine-readable representation 135 associated with the characters 131 and possibly the key check value 210.

In an aspect, the characters 131 are checked for tampering. In an aspect, the key check value 210 is used for this purpose. In an aspect, an algorithm that is common to the generator computer 105 and the code processor 811 is executed on the code processor 811 to compute a second key check value for the password 131. This second key check value is compared against the incoming key check value 210. If there is a difference between the two values, then the incoming characters do not match the characters 131 generated by the generator computer 105 (FIG. 8). In some implementations, in response to lack of a match, the generated characters are deleted, an error is logged, and/or authorities are informed.

Continuing to refer to FIG. 9, the code processor 811 receives the password manager password 806 and retrieval key 807 from a user through the user interface 801. This process includes prompting the user for the password manager password 806. As shown in the example of FIG. 9, the password manager password/key receiver component 905 may provide the prompting and receiving functionality. In an aspect, the prompting includes a visual prompt on the user interface 801, which may include a monitor/keyboard connected to the user computer 803, an integrated touchscreen display in a smart cell phone or tablet, or any type of interface device 801 which can receive input. In an aspect, the password manager password/key receiver component 905 provides an audible prompt and receives audible input, or any other type of input via the user interface 801. In an aspect, the password manager password/key receiver component 905 provides a haptic prompt and receives tactile input via the user interface 801. In an aspect, the password manager password/key receiver component 905 converts any non-character entries to characters, for example, or any computer-readable form. In an aspect, the password manager password/key receiver component 905 prompts the user for a retrieval key 807. The retrieval key can be received in any form, for example as described herein with respect to the password manager password 806, and the password manager password/key receiver component 905 converts the input retrieval key 807 to characters, for example, or any computer-readable form.

Continuing to refer to the example of FIG. 9, the password manager password 806 and the retrieval key 807 are provided to the password manager accessor 901. The password manager accessor 901 invokes the password manager 813 and attempts to use the supplied password manager password 806 to log into the password manager 813. The password manager 813, which may be a conventional product (e.g., a downloadable software application), could require multi-factor authentication as part of its login procedure. The password manager accessor 901 invokes the user interface 801 to initiate the multi-factor authentication process with the user. If access is not allowed because the password 806 is incorrect, or the multi-factor authentication failed, the user is informed and offered the opportunity to retry entering the required information. A pre-selected number of retries is allowed. Each failure is logged, and the characters of the attempted password(s) and other required input are deleted without being stored or otherwise retained on the user computer 803.

Continuing to refer to FIG. 9, if the password manager 813 is successfully logged into, the password receive/store component 903 takes execution control. The password receive/store component 903 communicates with the password manager 813 that high-entropy security information (e.g., 131, 135, 210) is to be stored by the password manager 813. The interface format for providing this information depends on the password manager 813 that is configured in the system. In an aspect, the password manager 813 provides an applications programming interface (API) that is used to store and access passwords. In an aspect, the password receive/store component 903 accesses the password manager 813 according to high level user interface protocols. When the password manager 813 is prepared to accept password information for storage, the password receive/store component 903 supplies the generated password information (e.g., 131, 135, 210), possibly along with the password retrieval key 807. If the password manager 813 experiences a failure in storing the generated high-entropy security information, the password receive/store component 903 receives a notification from the password manager 813, and relays that information to the user. In an aspect, the password receive/store component 903 is configured to automatically retry storing the high-entropy security information before informing the user, logging the error, and informing authorities. In an aspect, the password receive/store component 903 uses the capabilities provided by a conventional password manager 813, such as, for example, but not limited to revoking user access, and tracking every user action performed in real time.

Continuing to refer to the example shown in FIG. 9, at some future time after storing the generated high-entropy security information via the password manager 813, when it is desired to access the target computer 205, the target computer's generated high-entropy security information (e.g., 131, 210, 135) is retrieved from the password manager 813. In this use case, when the code processor 811 is invoked, the password manager password/key receiver component 905 prompts the user for the password manager password 806, as described herein. The password manager password receiver component 905 receives the password manager password 806 and provides it to the password manager accessor 901 as described herein. If the password manager 813 is successfully invoked, the password manager password receiver component 905 prompts the user for the retrieval key 807, which is used by the password manager accessor 901 to retrieve the target computer high-entropy security information (e.g., 131, 135, 210). The password verify process component 909 is invoked to verify that the retrieved target computer characters 131 have not been tampered with, as described herein (see, e.g., FIG. 4). If the characters 131 cannot be verified or otherwise do not pass security checks, an error is logged, authorities are informed, the password information is deleted from the password manager 813, and possibly other actions are taken, such as informing the user through the user interface 801. If the characters 131 are verified, the password information is provided to the user in visual, audible, or other form.

Referring again to the example shown in FIG. 8, the target computer 205 can be accessed by using the high-entropy security information displayed or otherwise provided on the user computer's user interface 801. In an aspect, the target computer 205 is configured with a reader 220 (e.g., a barcode reader). The target computer reader 220 can use the reader 220 to scan any of the high-entropy security information provided to the user, for example, high-entropy security information that is displayed on the user computer user interface 801. The target computer reader 220 has been described elsewhere herein with respect to scanning print media (See FIG. 5, reference #510, for example,).

Figure 10A:
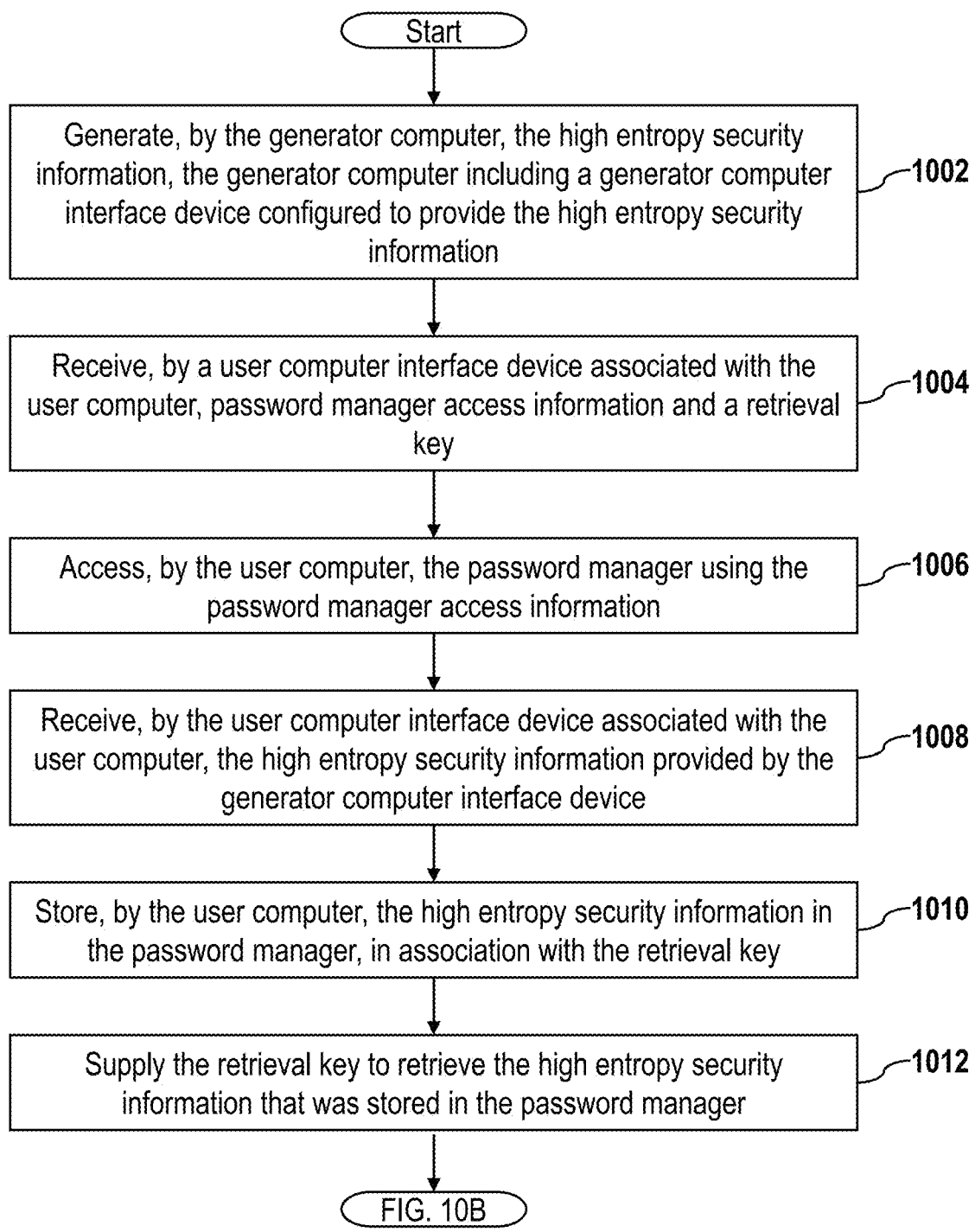
FIGS. 10A-10B are flowcharts of an exemplary method which may be executed consistent with embodiments of the invention.
Figure 10B:
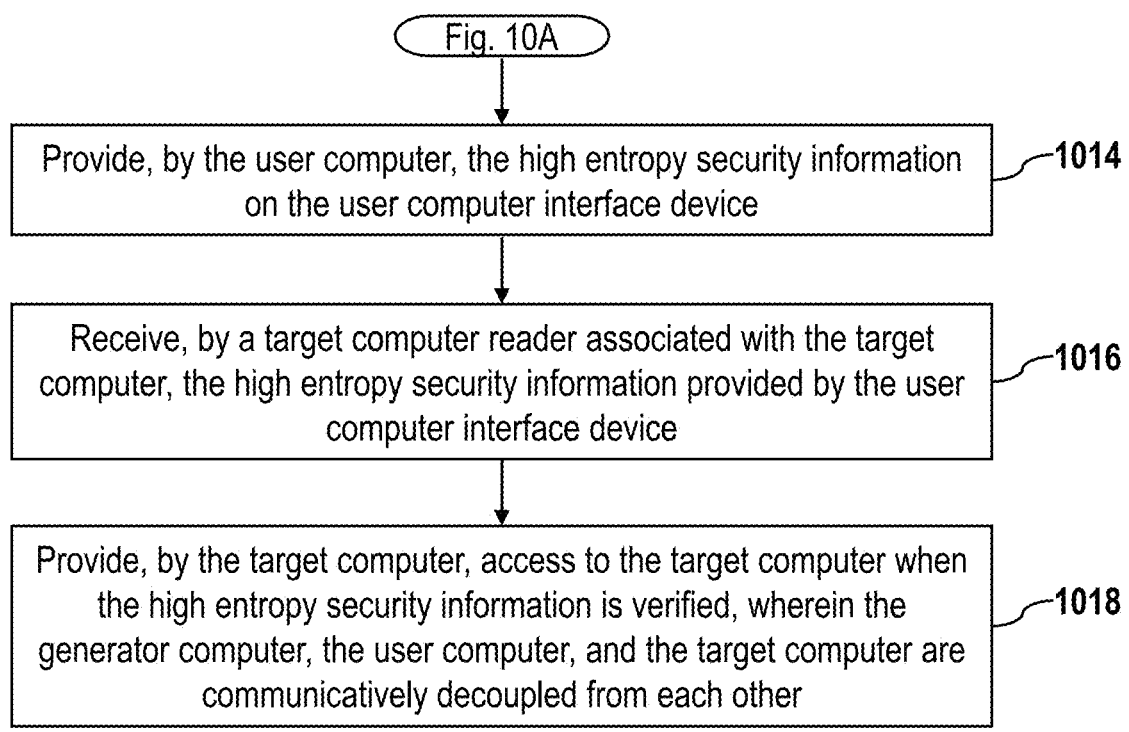

FIGS. 10A and 10B show an example of a method 1000 for securely maintaining high entropy data. In various implementations, some or all of the operations of the method 1000 may be performed by the user computer 803 or a similar computing system. Referring now to the example shown in FIG. 10A, the method 1000 for securely maintaining high entropy data can include, but is not limited to including, generating 1002, by the generator computer 105, the high entropy security information. The generator computer 105 includes a generator computer interface device configured to provide the high entropy security information. The user computer and the generator computer are electronically and/or communicatively decoupled from each other. For example, the user computer 803 and the generator computer 105 do not have any communications means, (e.g., neither digital, analog, wired, wireless, optical, nor otherwise), that connect one to the other.

The method 1000 further includes receiving 1004, by a user computer interface device associated with the user computer 803, password manager access information and a retrieval key.

The method 1000 further includes accessing 1006, by the user computer 803, the password manager using the password manager access information.

The method 1000 further includes receiving 1008, by the user computer interface device associated with the user computer, the high entropy security information provided by the generator computer interface device, and storing 1010, by the user computer 803, the high entropy security information in a password manager (e.g., as described with regard to FIGS. 8 and 9) in association with the retrieval key.

As a result of receiving a request for the high entropy data for use to access a target computer (e.g., from a user via the user interface device of the user computer 801), the method 1000 includes supplying 1012 the retrieval key to retrieve the high entropy security information that was stored in the password manager. The target computer and the user computer are electronically and/or communicatively decoupled from each other. For example, the user computer 803 and the target computer 205 do not have any communications means, (e.g., neither digital, analog, wired, wireless, optical nor otherwise), that connect one to the other.

Referring now to FIG. 10B, the method 1000 further includes retrieving and providing 1014, by the user computer 803, the high entropy information from the password manager (e.g., as described with as described with regard to FIGS. 8 and 9) to the user interface device which is electronically coupled with the user computer 803.

The method 1000 further includes receiving 1016, by a target computer reader associated with the target computer, the high entropy security information provided by the user computer interface device, and providing 1018, by the target computer, access to the target computer when the high entropy security information is verified, wherein the generator computer, the user computer, and the target computer are communicatively decoupled from each other.

Various aspects of the present disclosure can be summarized as follows:

Aspect 1. A system for securely accessing a target computer using high entropy security information stored in a password manager, the system comprising a generator computer configured to generate the high entropy security information, the generator computer including a generator computer interface device configured to provide the high entropy security information; and a user computer including a user computer interface device, a user computer reader, and a processor that is operably connected to the user computer interface device and the user computer reader, the processor being configured to execute operations including receiving, using the user computer interface device, password manager access information and a retrieval key, accessing the password manager using the password manager access information, receiving, using the user computer reader, the high entropy security information provided by the generator computer interface device, storing the high entropy security information in the password manager, in association with the retrieval key, supplying the retrieval key to retrieve the high entropy security information that was stored in the password manager and providing the high entropy security information on the user computer interface device, wherein the target computer includes a target computer reader configured to receive the high entropy security information provided by the user computer interface device, and a reader processor configured to provide access to the target computer when the high entropy security information is verified, wherein the generator computer, the user computer, and the target computer are communicatively decoupled from each other.

Aspect 2. The system of aspect 1 wherein the user computer reader comprises an image scanner or an optical character scanner.

Aspect 3. The system of any of aspects 1-2 wherein the user computer interface device comprises a display and keyboard, a microphone, or a haptic device.

Aspect 4. The system of any of aspects 1-3 wherein the processor is included in any of: a laptop, a handheld computer, a desktop computer, or a tablet.

Aspect 5. The system of any of aspects 1-4 wherein the operations further comprise detecting a security issue with the high entropy security information by validating the high entropy security information, and reporting the security issue.

Aspect 6. The system of any of aspects 1-5 wherein the high entropy security information comprises characters, a machine-readable representation of the characters and a key check value associated with the characters, wherein the key check value is configured to verify that the characters have not changed between accesses.

Aspect 7. The system of aspect 6 wherein the machine-readable representation comprises a bar code.

Aspect 8. The system of any of aspects 1-7 wherein the operations further comprise deleting the high entropy security information from the user computer after storing the high entropy security information in the password manager.

Aspect 9. The system of any of aspects 1-8 wherein the operations further comprise deleting the password manager access information from the user computer.

Aspect 10. A method for securely accessing a target computer using high entropy security information generated by a generator computer, the high entropy security information stored in a user computer by a password manager, the method comprising generating, by the generator computer, the high entropy security information, the generator computer including a generator computer interface device configured to provide the high entropy security information; receiving, by a user computer interface device associated with the user computer, password manager access information and a retrieval key, accessing, by the user computer, the password manager using the password manager access information, receiving, by the user computer interface device associated with the user computer, the high entropy security information provided by the generator computer interface device, storing, by the user computer, the high entropy security information in the password manager, in association with the retrieval key, supplying the retrieval key to retrieve the high entropy security information that was stored in the password manager, providing, by the user computer, the high entropy security information on the user computer interface device, receiving, by a target computer reader associated with the target computer, the high entropy security information provided by the user computer interface device, and providing, by the target computer, access to the target computer when the high entropy security information is verified, wherein the generator computer, the user computer, and the target computer are communicatively decoupled from each other.

Aspect 11. The method of aspect 10 further comprising validating the high entropy security information including detecting a security issue with the high entropy security information and reporting the security issue.

Aspect 12. The method of aspect 11 further comprising deleting the high entropy security information from the user computer after storing the high entropy security information in the password manager.

Aspect 13. The method of any of aspects 10-12 further comprising deleting the password manager access information from the user computer.

Aspect 14. The method of any of aspects 10-13 wherein the high entropy security information comprises characters, a machine-readable representation of the characters; and a key check value associated with the characters, wherein the key check value is configured to verify that the characters have not changed between accesses.

Aspect 15. The method of aspect 14 wherein the machine-readable representation comprises a bar code.

Aspect 16. The method of any of aspects 10-15 wherein receiving, by the user computer interface device, the high entropy security information comprises scanning the high entropy security information provided by the generator computer using at least one of an image scanner or an optical character scanner.

Aspect 17. The method of any of aspects 10-16 wherein the user computer interface device comprises a display and keyboard, a microphone, or a haptic device.

Aspect 18. The method of any of aspects 10-17 wherein the user computer comprises any of a laptop, a handheld computer, a desktop computer, or a tablet.

Aspect 19. The method of any of aspects 10-18 wherein the high entropy security information comprises machine-readable information.

Aspect 20. A non-transitory computer-readable medium storing instructions that, when executed by one or more processors of a computing system, cause the computing system to securely access a target computer using high entropy security information generated by a generator computer, the high entropy security information being stored in a user computer by a password manager, the computing system performing operations, the operations comprising generating, by the generator computer, the high entropy security information, the generator computer including a generator computer interface device configured to provide the high entropy security information, receiving, by a user computer interface device associated with the user computer, password manager access information and a retrieval key, accessing, by the user computer, the password manager using the password manager access information, receiving, by a user computer interface device associated with the user computer, the high entropy security information provided by the generator computer interface device, storing, by the user computer, the high entropy security information in the password manager, in association with the retrieval key, supplying the retrieval key to retrieve the high entropy security information that was stored in the password manager, providing, by the user computer, the high entropy security information on the user computer interface device, receiving, by a target computer reader associated with the target computer, the high entropy security information provided by the user computer interface device, and providing, by the target computer, access to the target computer when the high entropy security information is verified, wherein the generator computer, the user computer, and the target computer are communicatively decoupled from each other.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Other embodiments of the invention will be apparent to those skilled in the art from consideration of the specification and practice of the invention disclosed herein. It is intended that this specification and the descriptions herein be considered as examples only, with a true scope and spirit of the invention being indicated by the claims. A computer/system as described herein may execute computer instructions or programs in order to perform the operations/functions.

The invention claimed is:

1. A system for securely accessing a target computer using high entropy security information stored in a password manager, the system comprising:
   a generator computer configured to generate the high entropy security information, the generator computer including a generator computer interface device configured to provide the high entropy security information; and
   a user computer including
      a user computer interface device;
      a user computer reader; and
      a processor that is operably connected to the user computer interface device and the user computer reader, the processor being configured to execute instructions to perform operations including:
         receiving, using the user computer interface device, password manager access information and a retrieval key;
         accessing the password manager using the password manager access information;
         receiving, using the user computer reader, the high entropy security information provided by the generator computer interface device;
         storing the high entropy security information in the password manager, in association with the retrieval key;
         supplying the retrieval key to retrieve the high entropy security information that was stored in the password manager; and
         providing the high entropy security information on the user computer interface device;
   wherein the target computer includes:
      a target computer reader configured to receive the high entropy security information provided by the user computer interface device, and
      a reader processor configured to provide access to the target computer when the high entropy security information is verified,
   wherein the generator computer, the user computer, and the target computer are communicatively decoupled from each other.

2. The system as in claim 1 wherein the user computer reader comprises:
   an image scanner or an optical character scanner.

3. The system as in claim 1 wherein the user computer interface device comprises:
   a display and keyboard, a microphone, or a haptic device.

4. The system as in claim 1 wherein the processor is included in any of: a laptop, a handheld computer, a desktop computer, or a tablet.

5. The system as in claim 1 wherein the operations further comprise:
   detecting a security issue with the high entropy security information by validating the high entropy security information; and
   reporting the security issue.

6. The system as in claim 1 wherein the high entropy security information comprises:
   characters;
   a machine-readable representation of the characters; and
   a key check value associated with the characters,
   wherein the key check value is configured to verify that the characters have not changed between accesses.

7. The system as in claim 6 wherein the machine-readable representation comprises:
   a bar code.

8. The system as in claim 1 wherein the operations further comprise:
   deleting the high entropy security information from the user computer after storing the high entropy security information in the password manager.

9. The system as in claim 1 wherein the operations further comprise:
   deleting the password manager access information from the user computer.

10. A method for securely accessing a target computer using high entropy security information generated by a generator computer, the high entropy security information stored using a user computer and a password manager, the method comprising:
   generating, by the generator computer, the high entropy security information, the generator computer including a generator computer interface device configured to provide the high entropy security information;
   receiving, by a user computer interface device associated with the user computer, password manager access information and a retrieval key;

accessing, by the user computer, the password manager using the password manager access information;

receiving, by the user computer interface device associated with the user computer, the high entropy security information provided by the generator computer interface device;

storing, by the user computer, the high entropy security information in the password manager, in association with the retrieval key;

supplying the retrieval key to retrieve the high entropy security information that was stored in the password manager;

providing, by the user computer, the high entropy security information on the user computer interface device;

receiving, by a target computer reader associated with the target computer, the high entropy security information provided by the user computer interface device; and providing, by the target computer, access to the target computer when the high entropy security information is verified, wherein the generator computer, the user computer, and the target computer are communicatively decoupled from each other.

11. The method as in claim 10 further comprising:
validating the high entropy security information including detecting a security issue with the high entropy security information and reporting the security issue.

12. The method as in claim 11 further comprising:
deleting the high entropy security information from the user computer after storing the high entropy security information in the password manager.

13. The method as in claim 10 further comprising:
deleting the password manager access information from the user computer.

14. The method as in claim 10 wherein the high entropy security information comprises:
characters;
a machine-readable representation of the characters; and
a key check value associated with the characters,
wherein the key check value is configured to verify that the characters have not changed between accesses.

15. The method as in claim 14 wherein the machine-readable representation comprises:
a bar code.

16. The method as in claim 10 wherein receiving, by the user computer interface device, the high entropy security information comprises:
scanning the high entropy security information provided by the generator computer using at least one of an image scanner or an optical character scanner.

17. The method as in claim 10 wherein the user computer interface device comprises:
a display and keyboard, a microphone, or a haptic device.

18. The method as in claim 10 wherein the user computer comprises any of a laptop, a handheld computer, a desktop computer, or a tablet.

19. The method as in claim 10 wherein the high entropy security information comprises:
machine-readable information.

20. A non-transitory computer-readable medium storing instructions that, when executed by one or more processors of a computing system, cause the computing system to securely access a target computer using high entropy security information generated by a generator computer, the high entropy security information being stored using a user computer and a password manager, the computing system executing instructions to perform operations, the operations comprising:

generating, by the generator computer, the high entropy security information, the generator computer including a generator computer interface device configured to provide the high entropy security information;

receiving, by a user computer interface device associated with the user computer, password manager access information and a retrieval key;

accessing, by the user computer, the password manager using the password manager access information;

receiving, by a user computer interface device associated with the user computer, the high entropy security information provided by the generator computer interface device;

storing, by the user computer, the high entropy security information in the password manager, in association with the retrieval key;

supplying the retrieval key to retrieve the high entropy security information that was stored in the password manager;

providing, by the user computer, the high entropy security information on the user computer interface device;

receiving, by a target computer reader associated with the target computer, the high entropy security information provided by the user computer interface device; and providing, by the target computer, access to the target computer when the high entropy security information is verified, wherein the generator computer, the user computer, and the target computer are communicatively decoupled from each other.

21. The non-transitory computer-readable medium as in claim 20 wherein the operations further comprise:
validating the high entropy security information including detecting a security issue with the high entropy security information and reporting the security issue.

22. The non-transitory computer-readable medium as in claim 21 wherein the operations further comprise:
deleting the high entropy security information from the user computer after storing the high entropy security information in the password manager.

23. The non-transitory computer-readable medium as in claim 20 wherein the operations further comprise:
deleting the password manager access information from the user computer.

24. The non-transitory computer-readable medium as in claim 20 wherein the high entropy security information comprises:
characters;
a machine-readable representation of the characters; and
a key check value associated with the characters,
wherein the key check value is configured to verify that the characters have not changed between accesses.

25. The non-transitory computer-readable medium as in claim 24 wherein the machine-readable representation comprises:
a bar code.

26. The non-transitory computer-readable medium as in claim 20 wherein receiving, by the user computer interface device, the high entropy security information comprises:
scanning the high entropy security information provided by the generator computer using at least one of an image scanner or an optical character scanner.

27. The non-transitory computer-readable medium as in claim 20 wherein the user computer interface device comprises:

a display and keyboard, a microphone, or a haptic device.

28. The non-transitory computer-readable medium as in claim 20 wherein the user computer comprises any of a laptop, a handheld computer, a desktop computer, or a tablet.

29. The non-transitory computer-readable medium as in claim 20 wherein the high entropy security information comprises:

machine-readable information.

30. A user computer for securely accessing a target computer using high entropy security information stored in a password manager, the user computer comprising:

a user computer interface device;

a user computer reader; and a processor that is operably connected to the user computer interface device and the user computer reader, the processor being configured to execute instructions to perform operations including:

receiving, using the user computer interface device, password manager access information and a retrieval key;

accessing the password manager using the password manager access information;

receiving, using the user computer reader, the high entropy security information provided by a generator computer interface device, coupled with a generator computer, the generator computer configured to generate the high entropy security information;

storing the high entropy security information in the password manager, in association with the retrieval key;

supplying the retrieval key to retrieve the high entropy security information that was stored in the password manager; and providing the high entropy security information on the user computer interface device for a target computer reader, coupled with the target computer, to receive the high entropy security information and provide access to the target computer when the high entropy security information is verified, wherein the generator computer, the user computer, and the target computer are communicatively decoupled from each other.

\* \* \* \* \*